US008873223B2

(12) United States Patent
Rahn et al.

(10) Patent No.: US 8,873,223 B2
(45) Date of Patent: Oct. 28, 2014

(54) CIRCUIT INTERCONNECT DEVICE RACKING APPARATUS, RACKING ASSEMBLIES, AND METHODS OF CONNECTING CIRCUIT INTERCONNECT DEVICES

(75) Inventors: Megan Rahn, Dallas, TX (US); Brian Campbell, Lantana, TX (US); Russell J. Wedemeyer, Colleyville, TX (US); Thomas W. Hawkins, Carrollton, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 276 days.

(21) Appl. No.: 13/595,653

(22) Filed: Aug. 27, 2012

(65) Prior Publication Data

US 2013/0048477 A1 Feb. 28, 2013

Related U.S. Application Data

(60) Provisional application No. 61/529,440, filed on Aug. 31, 2011.

(51) Int. Cl.
| H02B 1/04 | (2006.01) |
| H02B 1/20 | (2006.01) |
| H02B 1/056 | (2006.01) |
| H01H 71/02 | (2006.01) |
| H01H 71/08 | (2006.01) |

(52) U.S. Cl.
CPC .............. *H02B 1/0565* (2013.01); *H02B 1/205* (2013.01); *H01H 71/0264* (2013.01); *H01H 71/08* (2013.01)
USPC ........... 361/610; 361/605; 361/611; 361/615; 200/50.21; 200/50.24

(58) Field of Classification Search
USPC ......... 361/605, 608–611, 615–616, 622, 624, 361/675; 200/15, 50.21–50.22, 50.24, 200/50.27
See application file for complete search history.

(56) References Cited

U.S. PATENT DOCUMENTS

| 2,590,522 A | * | 3/1952 | Dyer et al. ..................... 361/675 |
| 4,121,276 A | | 10/1978 | Kovatch |
| 4,307,304 A | | 12/1981 | Kovatch |
| 4,448,450 A | | 5/1984 | Kleinecke |
| 4,491,896 A | * | 1/1985 | Rickmann ..................... 361/609 |
| 4,531,174 A | * | 7/1985 | Rickmann ..................... 361/609 |
| 4,703,137 A | | 10/1987 | Bohnen |
| 4,744,003 A | | 5/1988 | Clarey |
| 4,752,233 A | | 6/1988 | Cornish |
| 4,761,521 A | * | 8/1988 | Beck et al. ................. 200/50.21 |
| 4,768,967 A | * | 9/1988 | Fritsch .......................... 439/152 |

(Continued)

FOREIGN PATENT DOCUMENTS

DE 3731625 A1 3/1989

*Primary Examiner* — Robert J Hoffberg

(57) ABSTRACT

A circuit interconnect device racking apparatus is disclosed. The circuit interconnect device racking apparatus has a body adapted to couple to a circuit interconnect device, one or more frame connectors coupled to the body, a racking lever coupled to the body by a lever pivot, the racking lever having a cam mechanism component, and one or more bus connectors configured to connect to or disconnect from one or more bus bars responsive to rotation of the racking lever. Circuit interconnect device racking assemblies having the circuit interconnect device racking apparatus and methods of connecting circuit interconnect devices to one or more bus bars are disclosed, as are other aspects.

26 Claims, 19 Drawing Sheets

(56) References Cited

U.S. PATENT DOCUMENTS

| | | | |
|---|---|---|---|
| 4,870,542 A | 9/1989 | Clarey | |
| 4,912,599 A * | 3/1990 | Wittmer | 361/675 |
| 5,126,918 A | 6/1992 | Lamberti | |
| 5,172,300 A | 12/1992 | Lamberti | |
| 5,459,293 A | 10/1995 | Hodkin | |
| 5,535,102 A | 7/1996 | Ball | |
| 5,894,404 A | 4/1999 | Mazzella | |
| 5,894,405 A | 4/1999 | Fleege | |
| 6,061,230 A | 5/2000 | Broadnax, Jr. | |
| 6,205,019 B1 | 3/2001 | Krom | |
| 6,414,839 B1 | 7/2002 | Derksen | |
| 7,821,775 B2 | 10/2010 | Doddapadam | |
| 8,119,943 B2 | 2/2012 | Burzynski | |
| 8,545,245 B2 * | 10/2013 | Dozier | 439/211 |
| 2001/0012194 A1 | 8/2001 | Bernier | |
| 2012/0064746 A1 | 3/2012 | Bellows et al. | |

\* cited by examiner

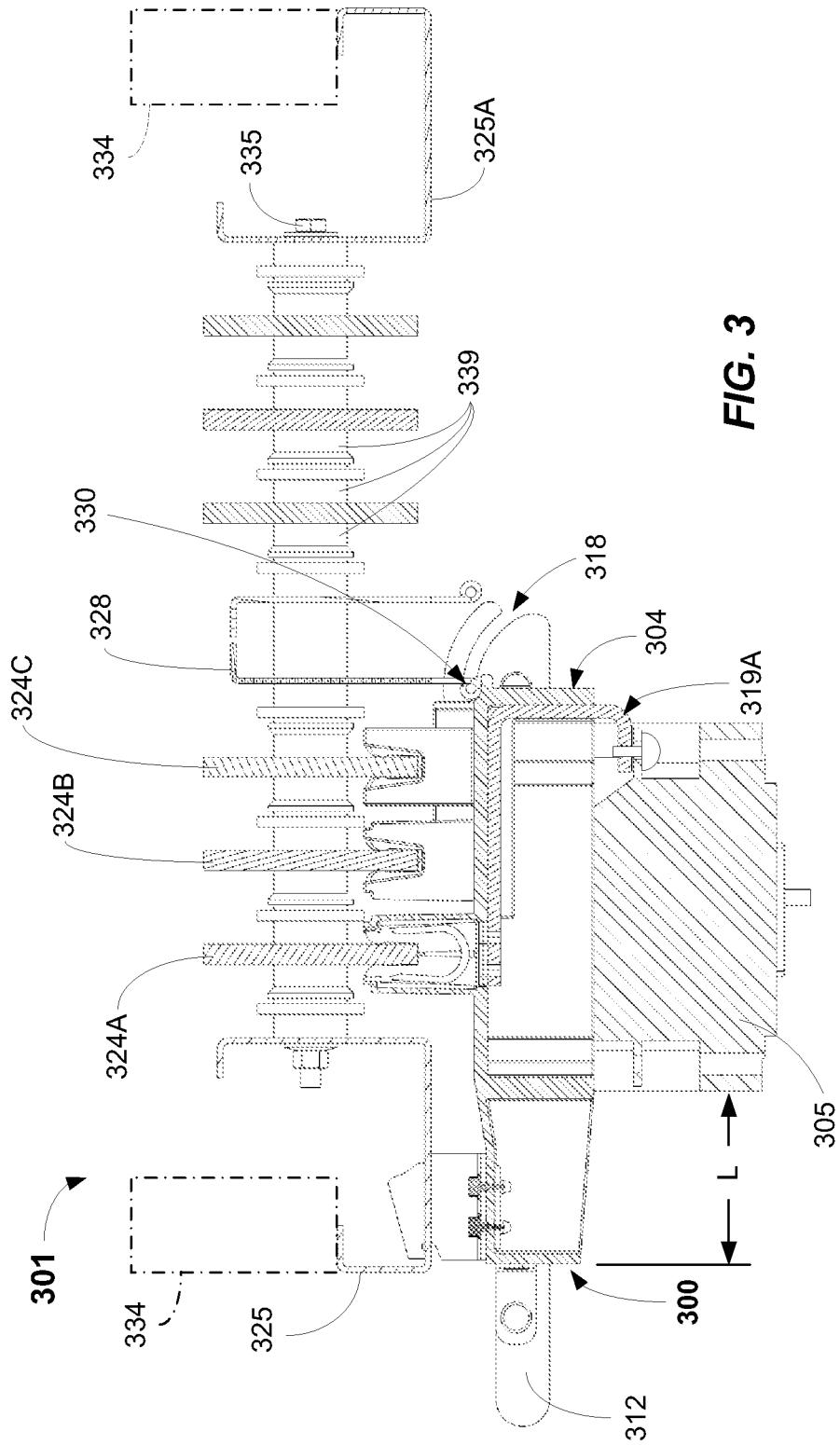

CIRCUIT INTERCONNECT DEVICE RACKING APPARATUS, RACKING ASSEMBLIES, AND METHODS OF CONNECTING CIRCUIT INTERCONNECT DEVICES

RELATED APPLICATIONS

This application claims priority to U.S. Provisional patent application Ser. No. 61/529,440 filed on Aug. 31, 2011, entitled "VL QUICK CONNECT," the disclosure of which is hereby incorporated by reference in its entirety herein.

FIELD

The present invention relates generally to racking apparatus, and more particularly to apparatus adapted to engage or disengage devices (e.g., circuit breakers) from one or more bus bars.

BACKGROUND

Circuit breakers can connect to one or more bus bars in panelboards or switchboards and may be used to protect connected electrical circuits. In certain cases, mechanisms may be used to aid in the installation of the circuit breakers to bus bars installed in the panelboards or switchboards. However, existing mechanisms are generally not versatile in that they provide for connection only in limited configurations, and may be difficult or time consuming to install and/or remove. Furthermore, once installed, they may not be securely held in place.

Thus, improved mechanisms for installation and/or removal (e.g., racking) of electrical circuit breakers from one or more bus bars are desired.

SUMMARY

In a first embodiment, a circuit interconnect device racking apparatus is provided. The circuit interconnect device racking apparatus includes a body adapted to couple so a circuit interconnect device, one or more frame connectors coupled to the body at a first end, a racking lever coupled to the body by a lever pivot, the racking lever having a cam mechanism component spaced from the lever pivot, and one or more bus connectors configured to connect to or disconnect from one or more bus bars responsive to rotation of the ranking lever.

In another aspect, a circuit interconnect device racking assembly is provided. The circuit interconnect device assembly includes a circuit interconnect device racking apparatus having a body adapted to couple to a circuit interconnect device one or more frame connectors coupled to the body at a first end, a racking lever coupled to the body by a lever pivot, the racking lever having a first cam mechanism component spaced from the lever pivot, and one or more bus connectors configured to connect to one or more bus bars, a first frame rail engageable by the frame connector, and a second frame rail having a second cam mechanism component engageable by the first cam mechanism component to cause connection of the one or more bus connectors to one or more bus bars.

In another assembly aspect, a circuit interconnect device racking assembly is provided. The circuit interconnect device racking assembly includes a circuit interconnect device racking apparatus including a circuit interconnect device having one or more line terminals and one or more load terminals, a body coupled to the circuit interconnect device, one or more frame connectors coupled to the body at a first end, a racking lever coupled to the body by a lever pivot, the racking lever having a first cam mechanism component spaced from the lever pivot, one or more bus connectors configured to connect to one or more bus bars, one or more bus conductor bar straps connected to the one or more line terminals, a first frame rail having a plurality of slots receiving the one or more frame connectors, a second frame rail having a second cam mechanism component engageable by the first cam mechanism component to cause rotation of the circuit interconnect device and body and connection of the one or more bus connectors to the one or more bus bars.

In a method embodiment, a method of connecting a circuit interconnect device is provided. The method includes providing a circuit interconnect device having one or more load terminals and one or more line terminals, providing a circuit interconnect device racking apparatus having a body coupled to the circuit interconnect device, one or more frame connectors coupled to the body at a first end, a racking lever coupled to the body by a lever pivot, the racking lever having a first cam mechanism component spaced from the lever pivot, and one or more bus connectors configured to connect to one or more bus bars, providing a first frame rail, providing a second frame rail having a second cam mechanism component, engaging the first frame rail with the with the one or more frame connectors, and engaging the first cam mechanism component with the second cam mechanism component to cause rotation of the body and the circuit interconnect device and connection of the one or more bus connectors to the one or more bus bars.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

DESCRIPTION OF DRAWINGS

FIG. 3 illustrates a cross-sectioned view of a circuit interconnect device racking assembly according to embodiments.

DESCRIPTION

Figure 1A:
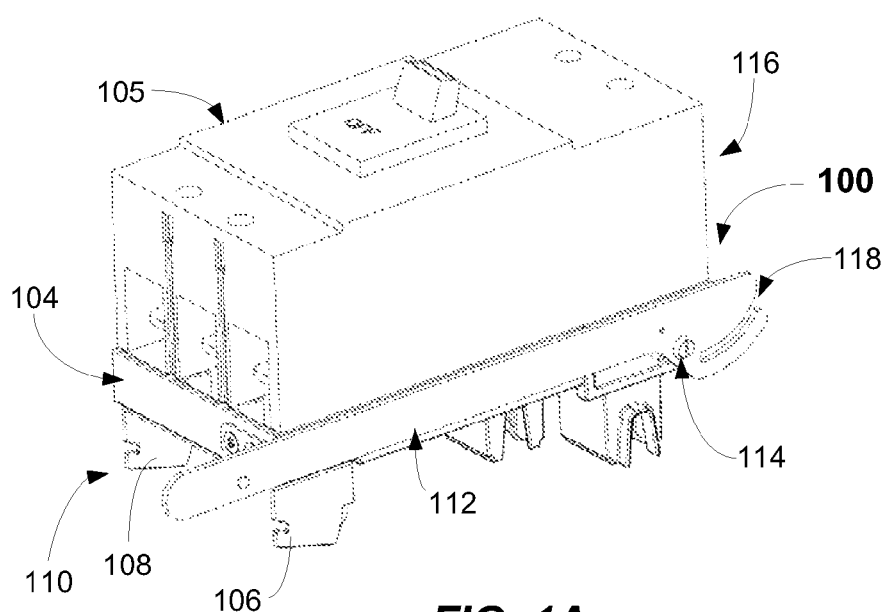
FIG. 1A illustrates a top isometric view of a circuit interconnect device racking apparatus having a coupled circuit interconnect device according to embodiments.

Embodiments of the circuit interconnect device racking apparatus are useful for electrically connecting or disconnecting a circuit interconnect device to or from one or conductor bars, such as one or more bus bars. Embodiments of the circuit interconnect device racking apparatus are especially adapted for use in switchboards or panelboards to facilitate the rapid installation of one or more circuit interconnect devices therein. The term "circuit interconnect device" as used herein means an electrical device adapted to carry electrical current and/or break (e.g., electrically open) an electrical circuit, electrically close an electrical circuit, limit an amplitude of electrical current in an electrical circuit, or monitor one or more electrical characteristics of a circuit (e.g., electrical current or power supplied to a circuit, or voltage relative to an electrical ground or another part of the circuit). The circuit interconnect device, in some embodiments, is one selected from a group consisting of a circuit breaker, an electrical switch, a branch circuit monitor, a surge protection device, and a lug. The circuit interconnect device may either break (e.g., electrically open) an electrical circuit or close an electrical circuit such as by separation and closing of electrical contacts therein. Such contact separation may be by mechanical tripping devices causing separation, electromechanical devices causing separation, manual tripping such as by moving (e.g., throwing a lever), or automated tripping devices. Current may be limited in circuit interconnect devices, that are, for example, surge protection devices. Current and/or voltage, or various combinations or mathematical functions thereof (derivatives), may be monitored by the circuit interconnect device comprising a branch circuit monitor. Other types of circuit interconnect devices may be used.

The circuit interconnect device racking apparatus may be used to quickly connect or disconnect a circuit interconnect device from one or more bus bars. Bus bars are electrical conduits adapted to carry one or more phases of electricity, such as an A, B, and/or C phases. The circuit interconnect device racking apparatus may be used with various sizes and types of circuit interconnect devices (e.g., circuit breaker, an electrical switch, a branch circuit monitor, a surge protection device, and a lug, or the like) and may be used to install the circuit interconnect devices in different orientations on a panelboard or switchboard. For example, the circuit interconnect device racking apparatus may be used to install, rack or plug a circuit interconnect device in either the front or rear connected configuration. The terms install, rack, and plug are used synonymously herein and mean connecting a circuit interconnect device to one or more conductor bars (e.g., one or more bus bars and/or one or more load bars). The circuit interconnect device racking apparatus allows the installation or removal of the circuit interconnect device without disturbing other switchboard or panelboard components. Embodiments may allow connection to one or more sets of bus bars and may be adapted for use with relatively larger or smaller circuit interconnect devices. In some embodiments, the circuit interconnect device racking apparatus may facilitate connection to both line side conductors (e.g., bus bars) and one or more load side conductors (e.g., runbacks).

In view of the foregoing, circuit interconnect device racking apparatus, circuit interconnect device racking assemblies, and methods of connecting circuit interconnect devices are provided.

According to one or more embodiments, a circuit interconnect device racking apparatus comprises a body adapted to couple to a circuit interconnect device, one or more frame connectors coupled to the body, a racking lever coupled to the body by a lever pivot, the racking lever having a cam mechanism component spaced from the lever pivot, and one or more bus connectors configured to connect to or disconnect from one or more bus bars responsive to rotation of the racking lever.

These and other embodiments of the circuit interconnect device racking apparatus, circuit interconnect device racking assemblies, and methods of connecting circuit interconnect devices to one or more bus bars are provided are described below with reference to FIGS. 1A-10. The drawings are not necessarily drawn to scale. Like numerals are used throughout to denote like elements.

Referring now in specific detail to FIGS. 1A through 1J, a circuit interconnect device racking apparatus 100 and its various components are shown. The circuit interconnect device racking apparatus 100 has a body 104 adapted to couple to a circuit interconnect device 105. The body 104 may be a separate component, as shown, to which the circuit interconnect device 105 is secured and coupled by means of one or more fasteners (e.g., screws, bolts, rivets, ultrasonic welding, adhesive, snaps or the like). Optionally, the body 104 may be made integral with a molded case of the circuit interconnect device 105.

Figure 1B:
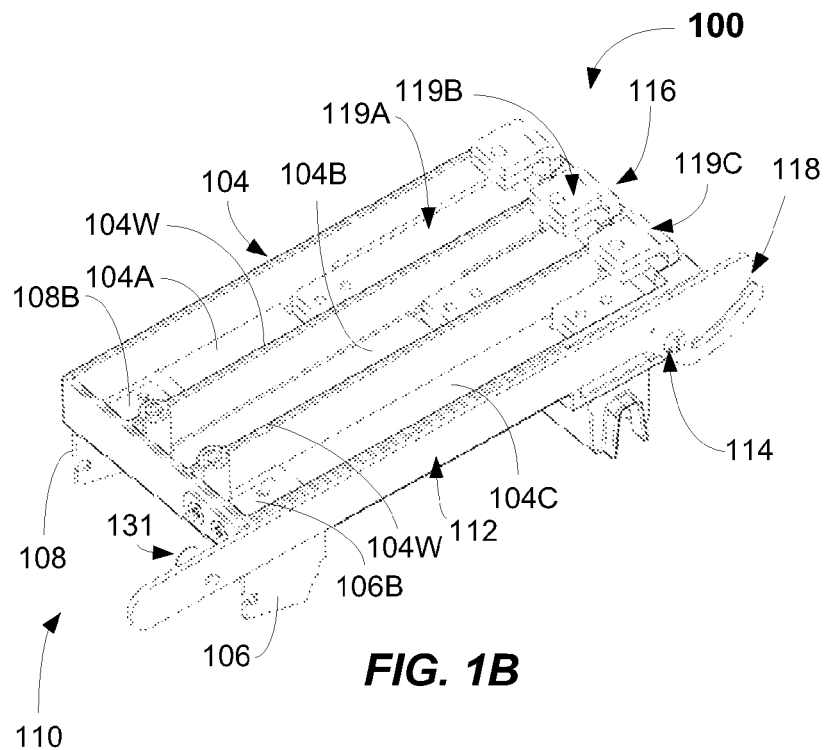
FIG. 1B illustrates a top isometric view of a circuit interconnect device racking apparatus with the circuit interconnect device removed according to embodiments.

The circuit interconnect, device racking apparatus 100 has one or more frame connectors 106, 108 coupled to the body 104 at a first end 110. The frame connectors 106, 108 may be manufactured from bent sheet metal (e.g., steel) as shown in FIG. 1G. In the depicted embodiment, two frame connectors 106 and 108 are provided to minimize the propensity for the racking apparatus 100 to tilt during racking and un-racking. The frame connectors 106, 108 may each have a laterally-oriented recess 106R, 108R (FIG. 1G) that is adapted to couple to and engage with a frame rail (e.g. frame rail 225—FIG. 2C), as will be discussed later herein. The frame connectors 106, 108 may be connected to the body 104 by suitable fasteners (e.g., screws, rivets, or the like) by being received into holes 106H, 108H and threading into the body 104 or by passing through the holes 106H, 108H and holes in the body 104 and threading into a backing plate 106B, 108B (FIG. 1B). The laterally-oriented recesses 106R, 108R may be slots having openings chat are wider than at a bottom thereof. Other embodiments may include slots having a hook shape, such as shown in FIG. 1A. In some embodiments, the frame connectors 106, 108 may be molded integrally with the body 104 and be made of a same plastic as the body 104. Body 104 may be molded of any suitable plastic, such as a thermoset plastic.

Figure 2A:
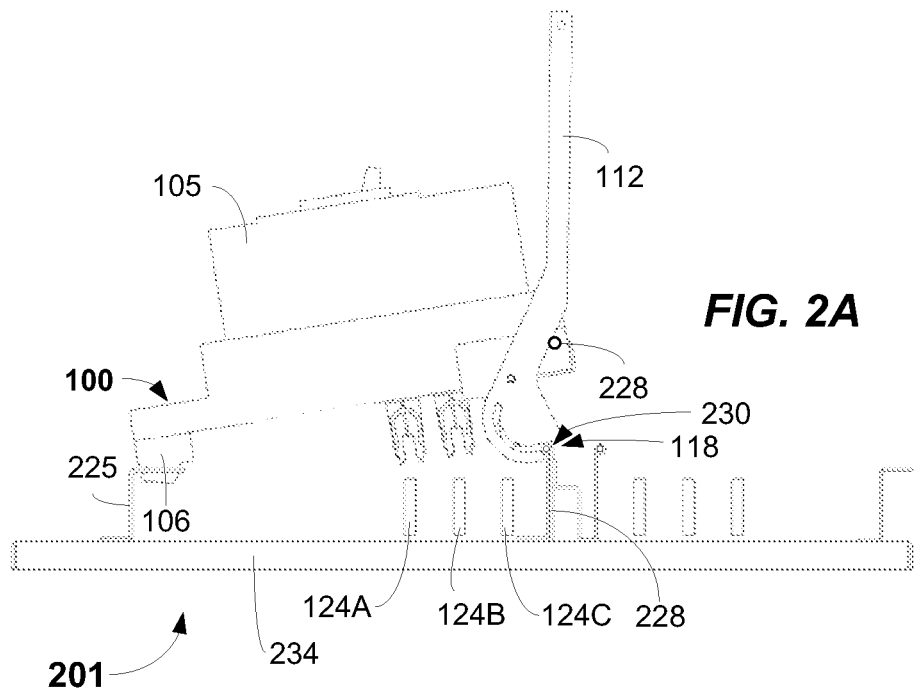
FIG. 2A illustrates a side view of a circuit interconnect device racking assembly in a disconnected (un-racked or un-plugged) configuration according to embodiments.
Figure 2B:
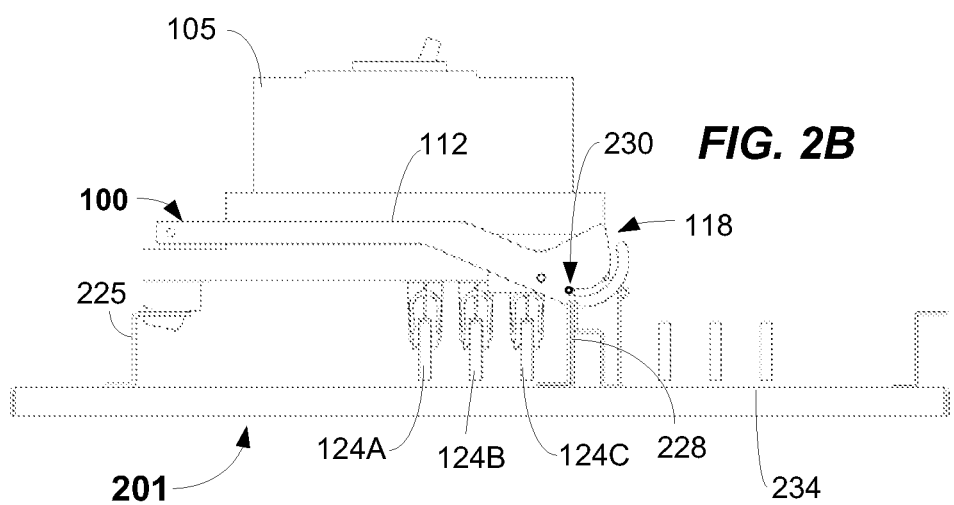
FIG. 2B illustrates a side view of a circuit interconnect device racking assembly in a connected (racked or plugged) configuration according to embodiments.

The circuit interconnect device racking apparatus 100 includes a racking lever 112 coupled to the body 104 by a lever pivot 114 at a second end 116. The lever pivot 114 may be formed by a suitable shoulder screw or like fastener providing a pilot shaft received through a through hole 117 (FIG. 1F) in the lever 112 thereby allowing the racking lever 112 to freely pivot relative to the body 104. Other suitable pivot-producing mechanisms may be used. The racking lever 112 has a first cam mechanism component 118 spaced from the lever pivot 114 and thus spaced from the through hole 117. The racking lever 112 has a grasping portion 112G adapted to be pushed or pulled by a user to initiate the racking action to rack or un-rack the circuit interconnect device (e.g., 105) from one or more conductor bars (e.g., bus bars 124A, 124B, 124C as shown in FIGS. 2A and 2B).

Figure 2C:
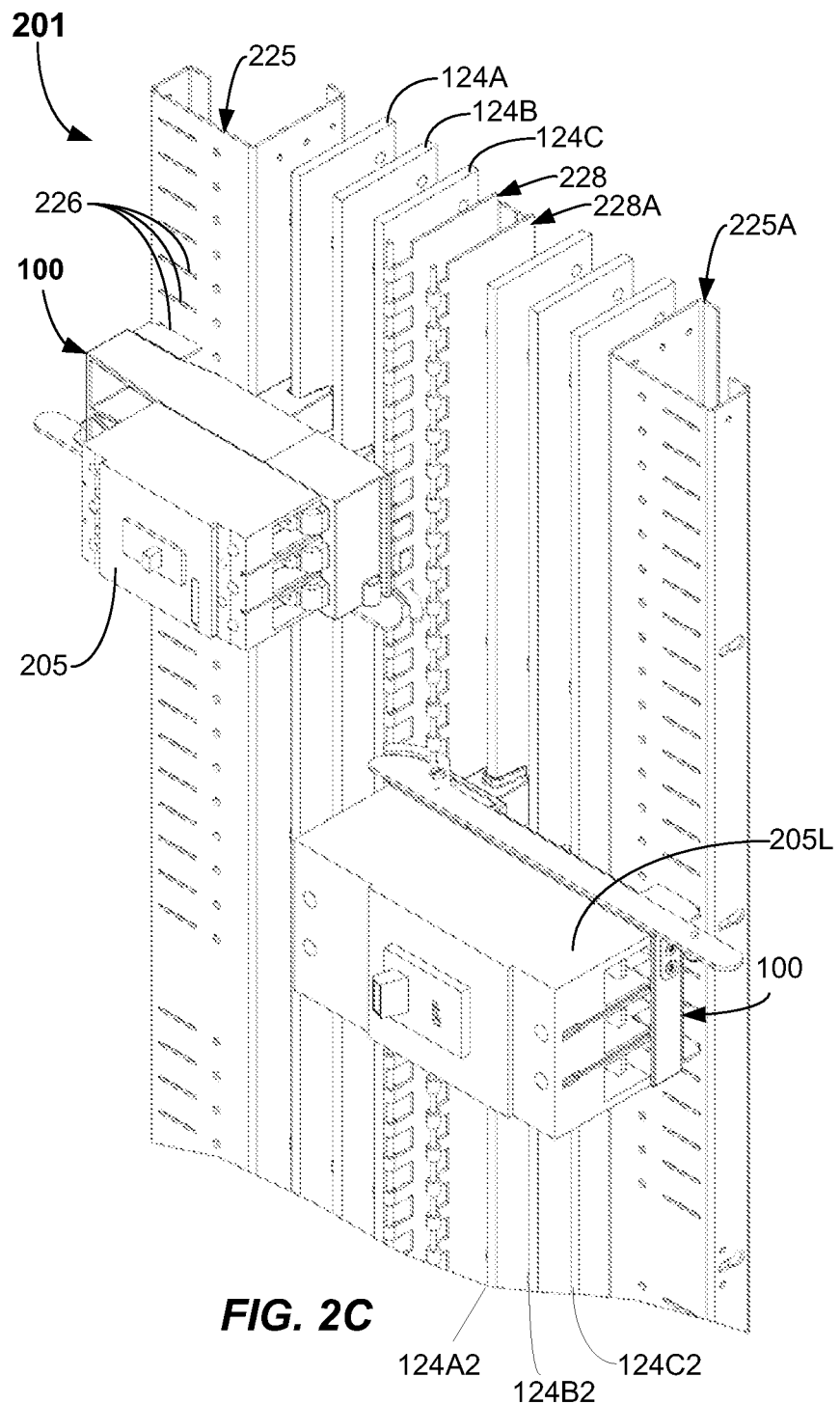
FIG. 2C illustrates an isometric view of a circuit interconnect device racking assembly having multiple connected (racked or plugged) circuit interconnect device racking apparatus according to embodiments.
Figure 2D:
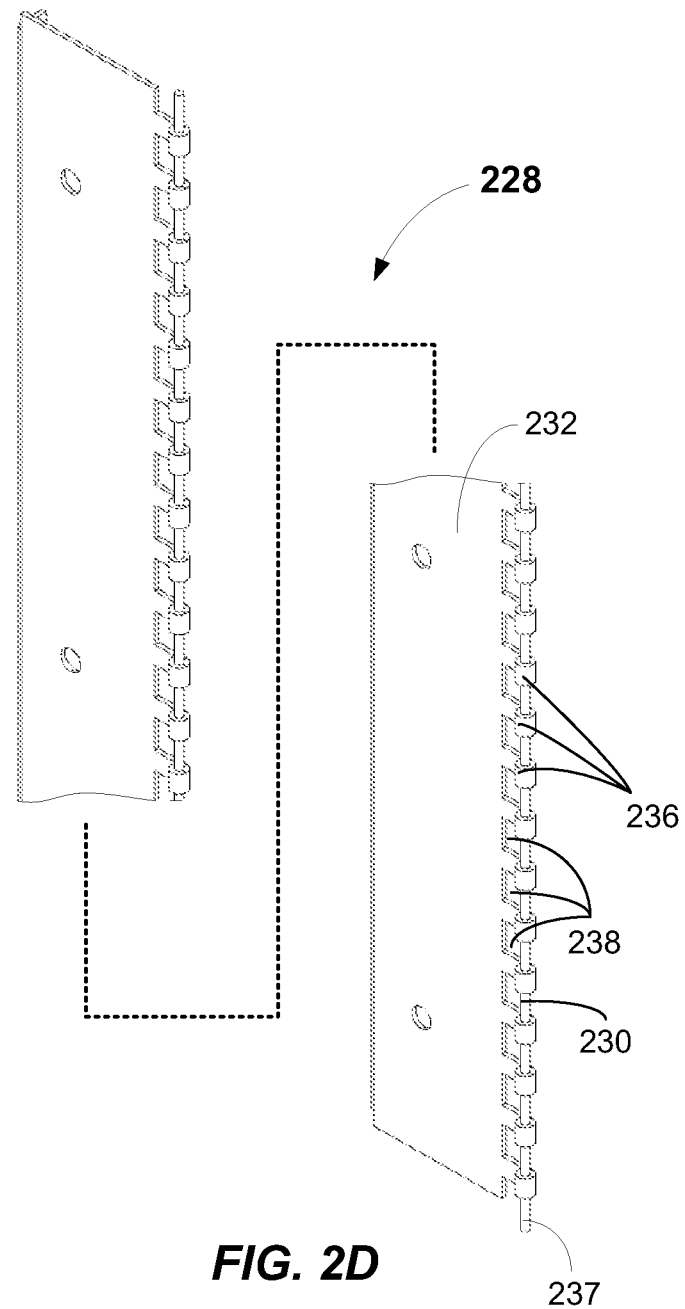
FIG. 2D illustrates an isometric view of a frame rail of a circuit interconnect device racking assembly according to embodiments.

The cam mechanism component 118 may comprise a cam in some embodiments. In the depicted embodiment, the cam is formed along an open-ended slot. As will be apparent, the open end 118O is adapted to receive a second cam mechanism component 230 (e.g., a pin as shown in FIG. 2D) therein. The pin rides along the cam as the racking lever 112 is rotated thereby rotating the body 104 to rack or un-rack, depending on the rotation direction. The open-ended slot 118O may have at least one curved cam surface 118A, and in the depicted embodiment, two opposed, curved cam surfaces 118A, 118B. These cam surfaces 118A, 118B engage the second cam mechanism component 230 (e.g., a pin) upon rotation of the racking lever 112 and cause the body 104 and connected circuit interconnect device 105 to pivot about the frame connector 106, 108 and the first frame rail 225 (FIG. 2C). In the depicted embodiment, the racking lever 112, when in a fully-racked orientation, lies in a roughly parallel orientation to a bottom of the circuit interconnect device 105 coupled to the body 104 as shown in FIG. 2B.

Figure 1C:
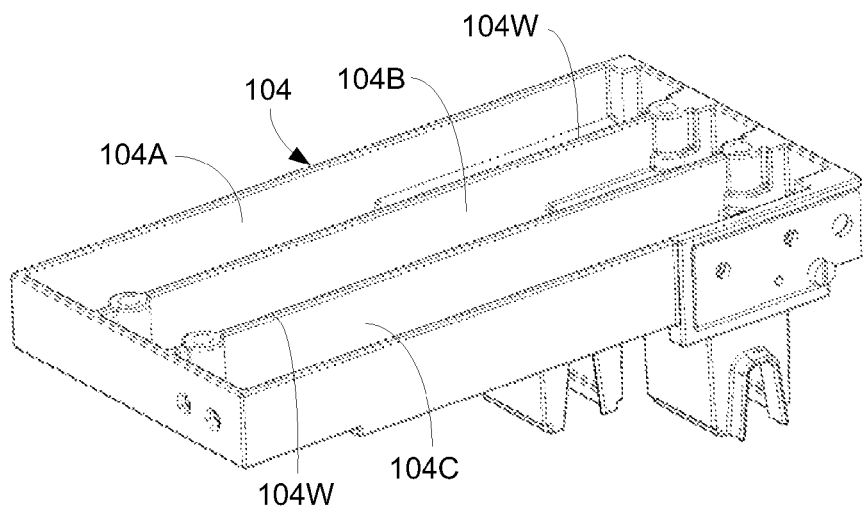
FIG. 1C illustrates a top isometric view of a body of a circuit interconnect device racking apparatus according to embodiments.
Figure 1D:
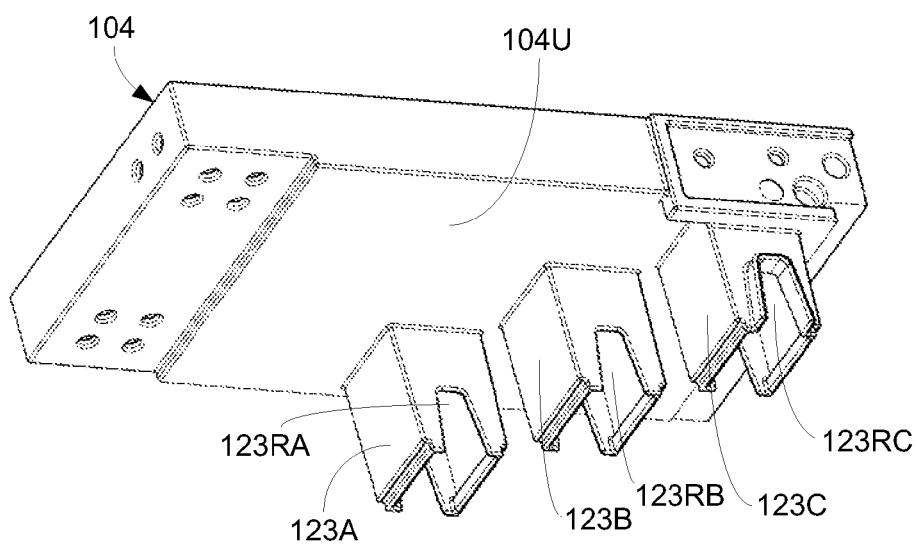
FIG. 1D illustrates a bottom isometric view of a body of a circuit interconnect device racking apparatus according to embodiments.
Figure 1E:
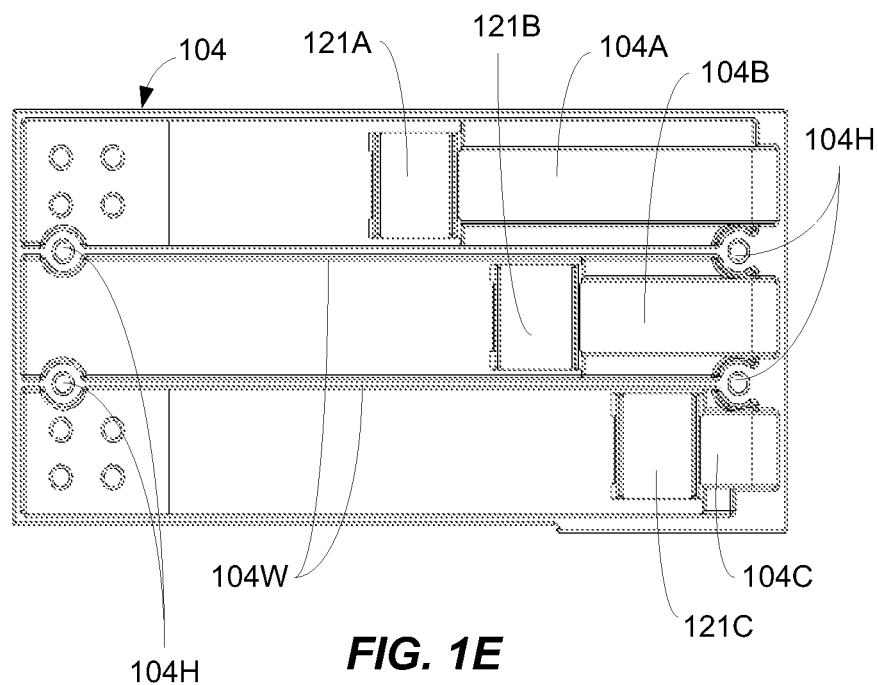
FIG. 1E illustrates a top plan view of a body of a circuit interconnect device racking apparatus according to embodiments.
Figure 1F:
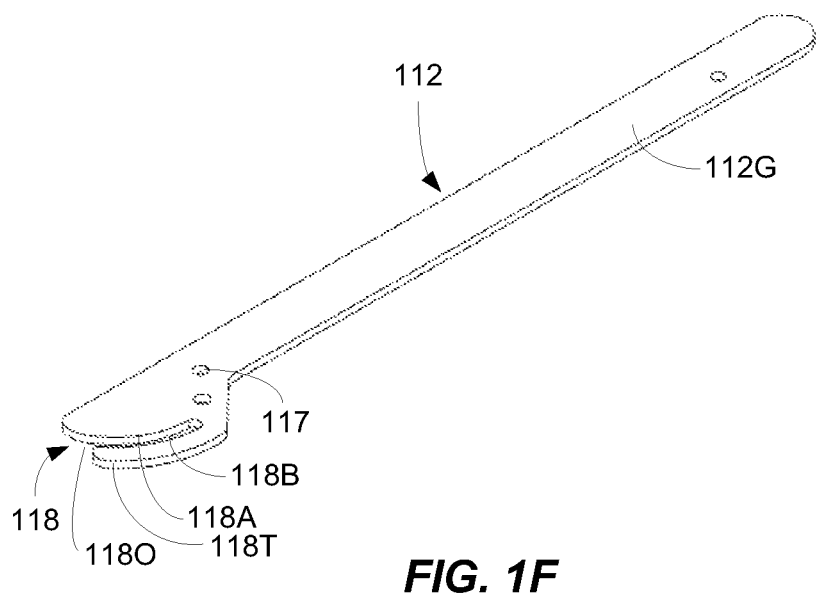
FIG. 1F illustrates an isometric view of a racking lever of a circuit interconnect device racking apparatus according to embodiments.
Figure 1G:
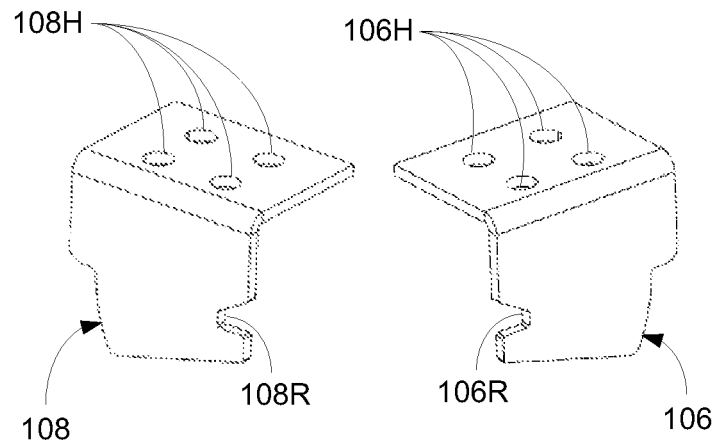
FIG. 1G illustrates isometric views of frame connectors of a circuit interconnect device racking apparatus according to embodiments.
Figure 1H:
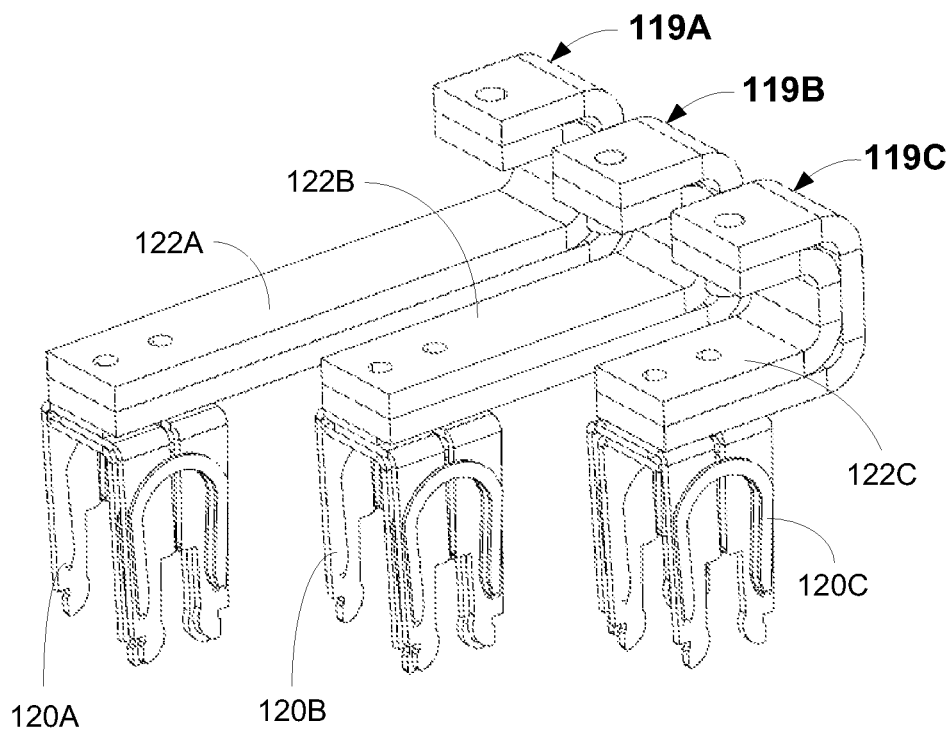
FIG. 1H illustrates isometric views of a line conductor assembly of a circuit interconnect device racking apparatus according to embodiments.
Figure 1I:
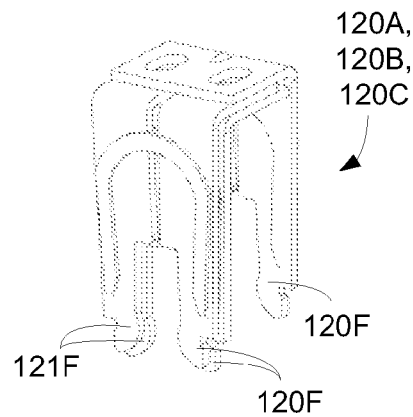
FIG. 1I illustrates isometric views of a bus connector of a circuit interconnect device racking apparatus according to embodiments.
Figure 1J:
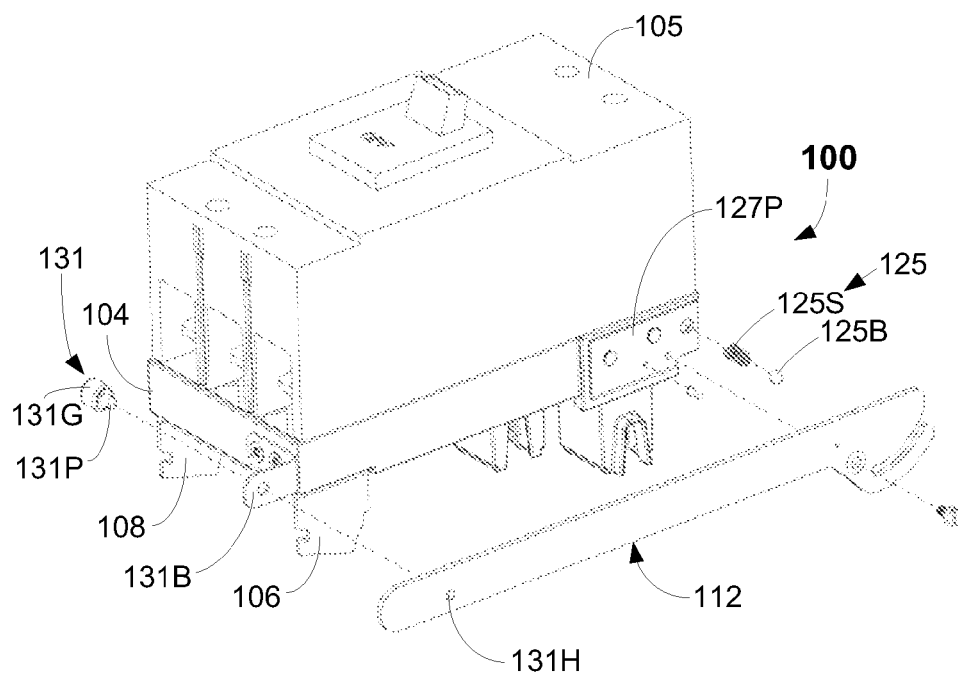
FIG. 1J illustrates a partially exploded isometric view of connections to the racking lever of a circuit interconnect device racking apparatus according to embodiments.

As shown in FIG. 1J, a detent mechanism 125 may be provided to act on the racking lever 112 to provide haptic feedback to a user when the lever 112 is in a racked or un-racked position. The detent mechanism may include a spring 125S and ball 125B. The ball 125B may be received in one or more depressions formed on the coupled side of the lever 112 (not shown). The ball 125B and spring 125S may be retained behind a plate 127P. When in the fully-racked position, as shown in FIG. 2B, the second cam mechanism component 230 (e.g., a pin) may engage the first cam mechanism component 118 (e.g., open-ended curved slot) at a closed end thereof. In this orientation, the circuit interconnect device 105 is electrically connected to the bus bars 124A, 124B, and 124C.

A locking mechanism 131 may be provided to engage the racking lever 112 such that the racking apparatus 100 may be locked onto the frame rails 225, 228 (FIG. 2C). In particular, the locking mechanism 131 may comprise a spring-loaded pin 131P which may be threaded where the body of the mechanism is securely connected to a bracket 131B physically coupled to the body 104 and the spring-loaded pin 131P is insertable in and retractable from a hole 131H which may also be threaded formed on the racking lever 112. Thus, a position of the lever 112 may be locked or unlocked by or rotating a grasping member 131G coupled to the spring loaded pin 131P.

To electrically connect the circuit interconnect device 105 to the one or more bus bars 124A, 124B, 124C, the circuit interconnect device racking apparatus 100 also has one or more conductor assemblies 119A, 119B, 119C (FIG. 1H). The one or more conductor assemblies 119A, 119B, 119C have one or more bus connectors 120A, 120B, 120C (e.g., spring-loaded clips) adapted to electrically connect to one or more conductor bars (e.g., bus bars 124A, 124B, 124C) and one or more conductor bus bar straps 122A, 122B, 122C adapted to couple to the line side (e.g., line side terminals) of the circuit interconnect device 105. For a three phase breaker (shown), the circuit interconnect device racking apparatus 100 will have three conductor assemblies 119A, 119B, and 119C as shown. However, in some embodiments, only one or two phases may be connected. Configurations including more conductor assemblies and more phases may be provided.

The one or more bus connectors 120A, 120B, 120C may be attached to one or more respective line terminals of the circuit interconnect device 105 by bus conductor bar straps 122A, 122B, and 122C. The bus conductor bar straps 122A, 122B, and 122C may be manufactured from a conductive material, such as a copper or aluminum material. Other electrically conductive materials may be used. The bus conductor bar straps 122A, 122B, and 122C may include a configuration that is J-shaped, where a second portion of each strap is bent back and lies over a first portion. The bus conductor bar straps 122A, 122B, and 122C may each comprise dual bars in some embodiments. The one or more bus connectors 120A, 120B, 120C may connect to the bus conductor bar straps 122A, 122B, 122C by suitable fastening means, such as bolts, screws, rivets, braising, or the like. The bus conductor bar straps 122A, 122B, and 122C may connect to the one or more line terminals of the circuit interconnect device 105 by suitable fastening means, such as bolts, screws, slide-in connections or the like. Optionally, the bus conductor bar straps 122A, 122B, and 122C may be made integral with the one or more line terminals.

As shown in FIG. 1I, the bus connectors 120A, 120B, 120C may each comprise clips having opposed fingers 120F, 121F. One or more, two or more, or even three or more sets of fingers 120F, 121F may be provided on each bus connector 120A, 120B, 120C. The bus connector 120A, 120B, 120C may be manufactured from a conductive material, such as a copper material.

Portions of each of the line conductor assemblies 119A, 119B, and 119C may be received in one or more pockets 104A, 104B, 104C which are formed in the body 104 as shown in FIGS. 1B, 1C and 1E. Walls 104W may separate the pockets 104A, 104B, and 104C. One or more openings 121A, 121B, 121C from the one or more pockets 104A, 104B, and 104C may be configured to receive the one or more bus connectors 120A, 120B, 120C therein. Each bus connector 120A, 120B, 120C extends through an opening 121A, 121B, 121C in the body 104 and is oriented to receive a bus bar 124A, 124B, 124C.

In the embodiment shown, the circuit interconnect device 105 may be coupled to the body 104 by suitable fasteners received through mounting holes 104H (FIG. 1E). As best shown in FIG. 1D, insulator sheaths 123A, 123B, 123C may extend from a under surface 104U of the body 104. The insulator sheaths 123A, 123B, 123C may at least partially surround the sides of the bus connectors 120A, 120B, 1205 and act as an insulator between adjacent bus connectors 120A, 120B, 120C. Side recesses 123RA, 123RB, 123RC in the insulator sheaths 123A, 123B, 123C allow the buses 124A, 124B, and 124C to pass through and connect to the bus connectors 120A, 120B, 120C.

As shown in FIGS. 2A and 2B, the circuit interconnect device racking apparatus 100 is part of a circuit interconnect device racking assembly 201 and is configured to connect the circuit interconnect device 105 to, or disconnect the circuit interconnect device 105 from, the one or more bus bars 124A, 124B, 124C. The connecting (FIG. 2B) or disconnecting (FIG. 2A) is responsive to rotation of the racking lever 112, such as by a user moving (e.g., rotating clockwise or counterclockwise) the racking lever 112. Such racking or un-racking using the circuit interconnect device racking apparatus 100 can be accomplished very rapidly, and without disturbing the surrounding circuit interconnect devices.

In more detail, to accomplish the racking and un-racking, the circuit interconnect device racking assembly 201 includes, the circuit interconnect device racking apparatus 100, a first frame rail 225 having a plurality of connection features 226, such as a plurality of laterally extending slots (See FIG. 2C) and a second frame rail 228 having a second cam mechanism component 230 that is engageable with the first cam mechanism component 118 (e.g., the open-ended slot).

In FIGS. 2B and 2C, the second cam mechanism component 230 comprises a pin that is shown engaged with the first cam mechanism component 118 which may be a curved, open-ended slot formed on the racking lever 112 in the depicted embodiment. Detailed views of an embodiment of the second frame rail 228 are shown in FIGS. 2A-2D. Referring now to FIG. 2D (end segments shown), the second frame rail 228 includes a frame body 232 adapted to couple so a frame 234 or in one alternative, directly to a panelboard or switchboard (not shown). In the second frame rail 228 shown, a plurality of support tabs 236 extend from the body 232 along its length and may be configured to receive a continuous pin 237 there through. This construction forms a clearance region 238 into which a tongue portion 118T (FIG. 1F) of the first cam mechanism component 118 (which is formed on the racking lever 112) may be received. Thus, a plurality of engagement regions may be provided along the length of the second frame rail 228 which may be engaged by the first cam mechanism component 118 on any number of racking apparatus 100 coupled to different circuit interconnect devices.

As shown in FIG. 2C, this circuit interconnect device racking assembly 201 allows numerous circuit interconnect devices, such as circuit interconnect device 205 (e.g., having a 250 A frame rating) and circuit interconnect device 205L (large having a (e.g., having a 600 A frame rating)) to be racked or un-racked very rapidly and installed in various orientations and configurations. Other sizes of circuit interconnect devices may be racked and un-racked by the racking apparatus 100, such as circuit breakers having a frame rating between about 100 A and 2000 A. Other frame-rated circuit interconnect devices may be used with the racking apparatus 100. Thus, the circuit interconnect device 205 and circuit interconnect device 205L, and others, may be quickly connected to or unconnected from the bus bars 124A, 124B, 124C, which may carry A, B, and C phases of electricity, and also to and from bus bars 124A2, 124B2, 124C2, which may also carry A, B, and C phases of electricity. As shown, the circuit interconnect device racking assembly 201 includes a second set of frame rails 225A, 228A identical to, but reversed from, the frame rails 225, 228. In this way, circuit interconnect devices (e.g., 205, 205L) may be installed and uninstalled on either side of the panelboard or switchboard (frame and box not shown for clarity). As can be seen, the interconnect device racking apparatus 100 may be adapted to be used with circuit interconnect devices having different sizes, different type, different rating, and different orientations.

FIG. 3 illustrates a cross-sectional view through a circuit interconnect device racking assembly 301 that includes a racking apparatus 300 and circuit interconnect device 305 that is configured for front connection. The connection to the first and second frame rails 325, 328 is shown. Further, the connection from the electric buses 324A, 324B, and 324C through the conductor assembly 319A is shown. The circuit interconnect device racking assembly 301 may be coupled to a frame structure 334, which may be part of, or coupled to, a container such as a switchboard or panelboard by any suitable means such as bolting or the like. The connection between the first and second cam mechanism components 318, 330 is as previously described.

The various center frame and bus components may be connected to the frame rails 325, 325A by insulators 339 (a few labeled) and a through bolt 335. As can be seen, the body 304 of the racking apparatus 300 may extend beyond the length of the circuit interconnect device 305 by a length L in some embodiments. In this manner, both smaller and larger circuit interconnect devices (small shown) may be accepted on a common body 304. Various holes may be provided at suitable locations in the body 304 for fastening different sized circuit interconnect, devices to the body 304.

Figure 4:
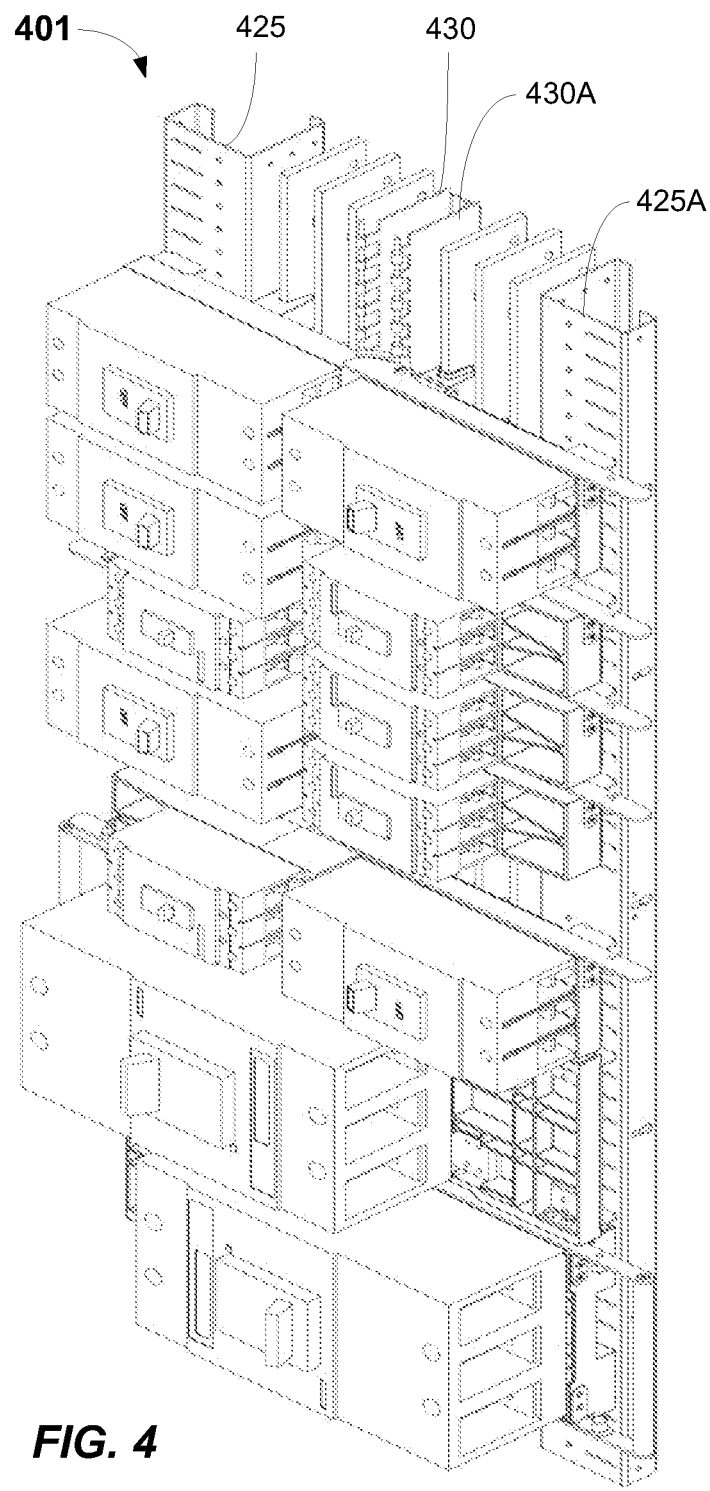
FIG. 4 illustrates an isometric view of a circuit interconnect device racking assembly having numerous different types, orientations and sizes of circuit interconnect devices and circuit interconnect device racking apparatus connected (racked or plugged) according to embodiments.

FIG. 4 illustrates a circuit interconnect device racking assembly 401 and illustrates the versatility of an embodiment of the present invention and the ease by which various circuit interconnect devices may be connected and unconnected. As can be seen, various sizes, types, and orientations of circuit interconnect devices may be installed or uninstalled using one or more embodiments of the circuit interconnect device racking apparatus (e.g., circuit interconnect device racking apparatus 100) described herein. Embodiments are shown with left-side connection, right-side connection, and connection to both sides. Connection of the various circuit interconnect device racking apparatus may be between a left-side frame rail 425 and a center frame rail 430 or 430A, between a right-side frame rail 425A and a center frame rail 430 or 430A, and between left-side frame rail 425 and a right-side frame rail 425A in some embodiments.

Figure 5A:
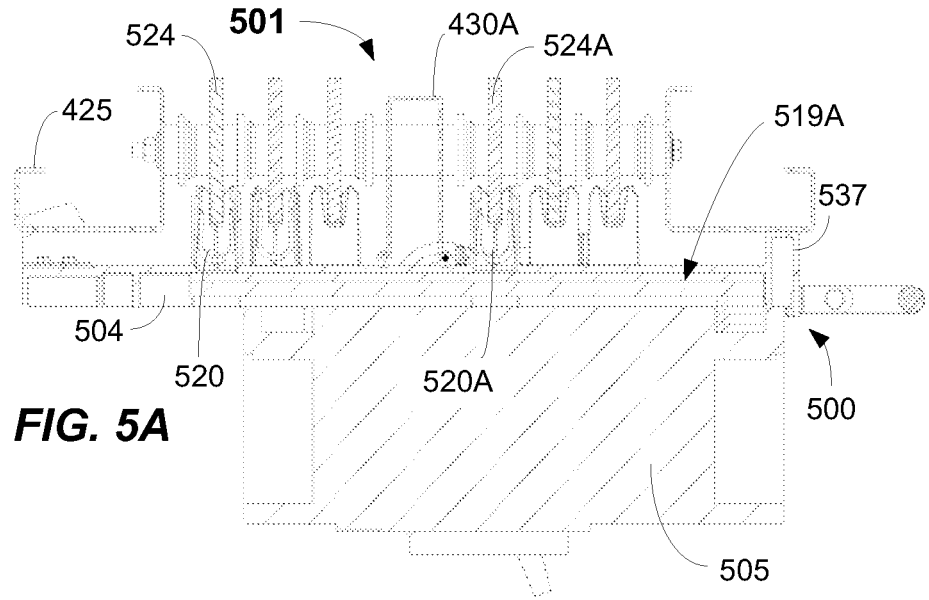
FIG. 5A illustrates a cross-sectioned side view of a circuit interconnect device racking assembly having an ability to electrically couple to bus bars across both sides of a panelboard or switchboard according no embodiments.

FIG. 5A illustrates a cross sectioned view of another alternate embodiment of a circuit interconnect device racking assembly 501 including a circuit interconnect device racking apparatus 500 and coupled circuit interconnect device 505 (internal breaker mechanisms not shown for clarity). In this embodiment, the circuit interconnect device 505 is a very large-sized circuit interconnect device having a frame rating of about 1600 A. The circuit interconnect device racking apparatus 500 includes the ability to connect each terminal of the circuit interconnect device 505 to multiple bus bars (e.g., two A, B, and C phase bus bars are shown connected in this embodiment.) A line side, conductor assembly 519A including two bus connectors 520, 520A coupled to the two A-phases buses 524, 524A is shown. Similar conductor assemblies may be coupled to the other phases. As before, the circuit interconnect device racking apparatus 500 may be coupled to a first frame rail 425 located on a left side of the assembly 501, and to a second frame rail 430A (e.g., a center frame rail). In this embodiment, the lever pivot 514 is located at a center of the body 504 rather than at the second end. The construction is as described before, except that the body 504 may include a stop 537 that is configured and operational to contact another frame rail or structure (e.g., the right frame rail 425A) when installed.

Figure 5B:
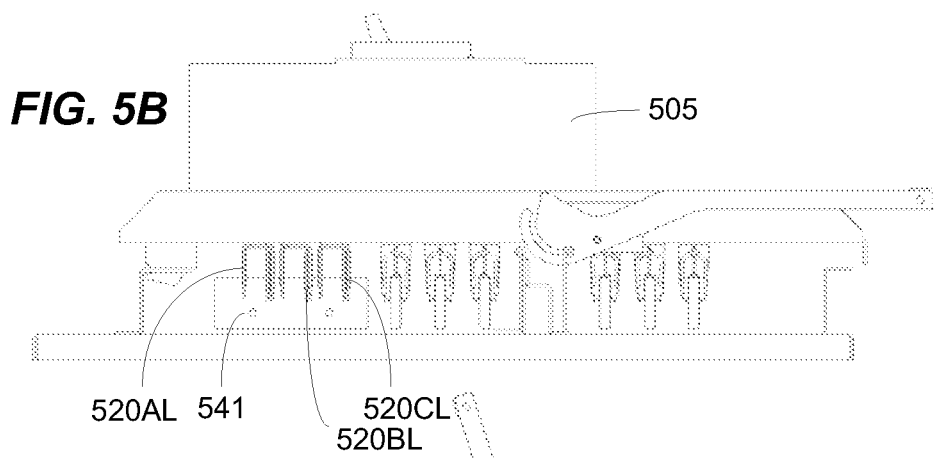
FIGS. 5B and 5C illustrate side views of a circuit interconnect device racking assembly having the ability to electrically couple to both a line side conductor and a load side conductor according to embodiments.
Figure 5C:
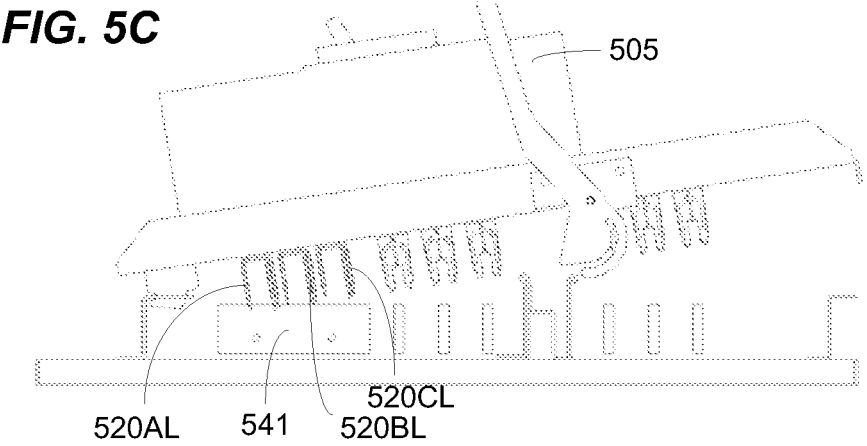
Figure 5D:
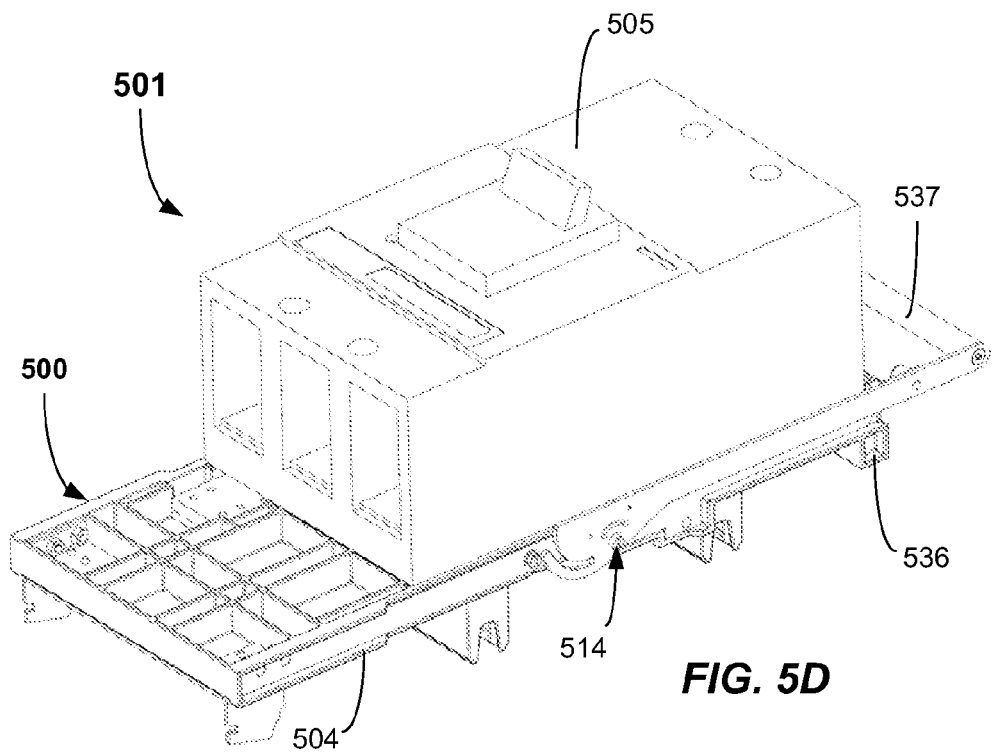
FIG. 5D illustrates an isometric view of a circuit interconnect device racking apparatus having racking levers on both sides according to embodiments.
Figure 5E:
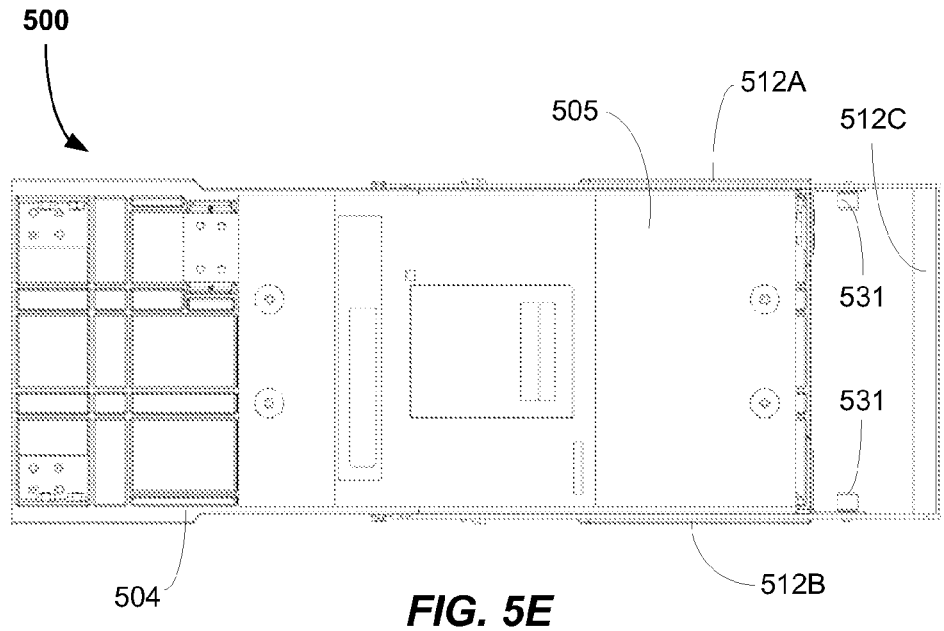
FIGS. 5E and 5F illustrate a top plan view and isometric view of a circuit interconnect device racking apparatus having racking levers on both sides according to embodiments.
Figure 5F:
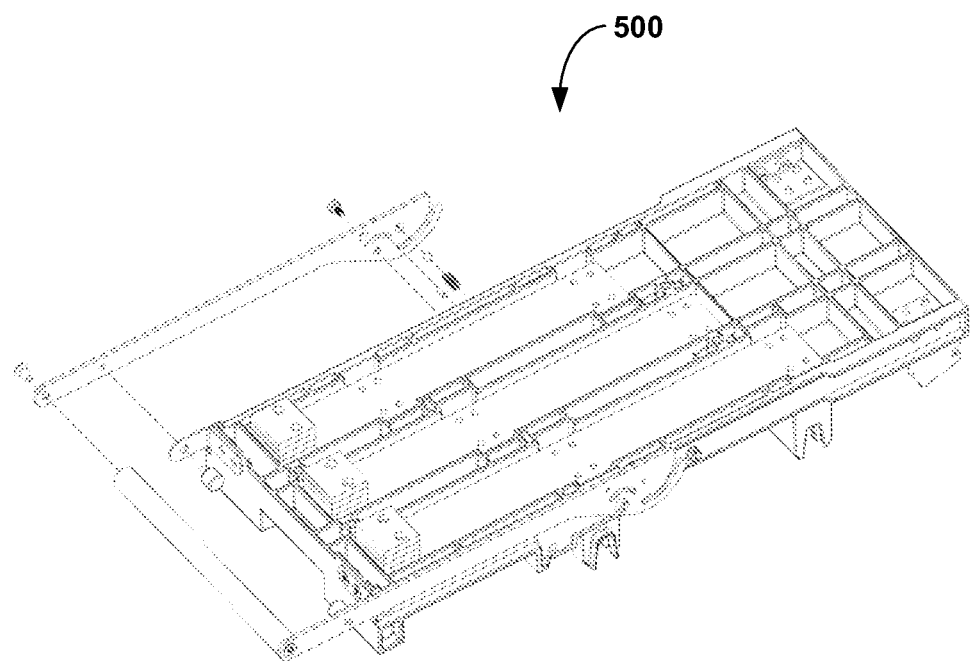

Further, as best shown in FIGS. 5D, 5E and 5F, the circuit interconnect device racking apparatus 500 includes first and second racking levers 512A, 512B on the respective sides of the body 504. The first and second racking levers 512A, 512B may be connected by a cross member 512C. Cross member 512C may be grasped and used to rack and un-rack the circuit interconnect device racking assembly 501. Locking members 531 are shown and function to lock the first and second racking levers 512A, 512B when the levers are in the fully-racked position. FIG. 5A illustrates a cross-sectioned view of the circuit interconnect device racking apparatus 500. Detent mechanisms as described above may also be provided.

FIGS. 5B and 5C illustrate the racking and un-racking of a large-sized circuit interconnect device 505 and connection to multiple A phase, B phase, and C phase bus bars. FIGS. 5B and 5C also illustrate connection to and disconnection from a load side conductor 541 by load connectors 520AL, 520BL, 520CL (e.g., clips), as will be described more thoroughly later herein.

Figure 6:
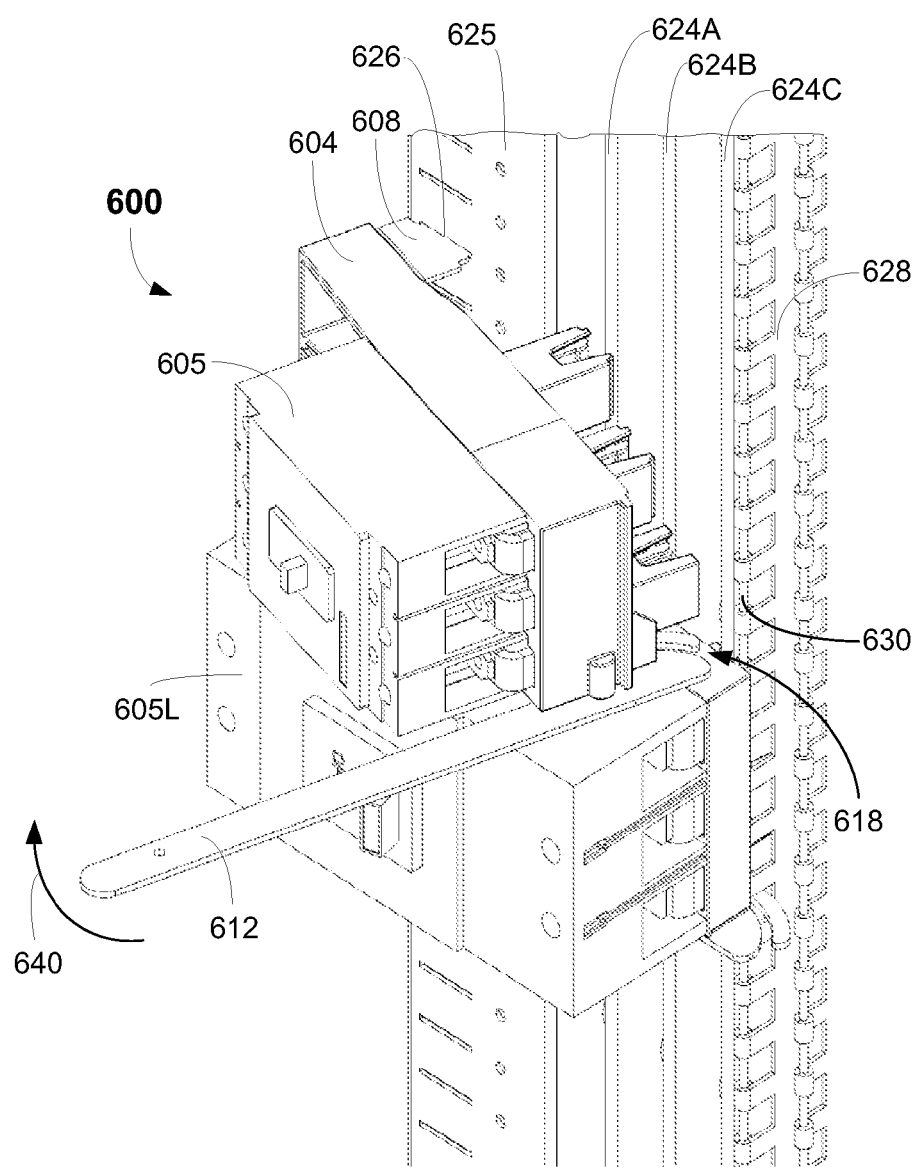
FIG. 6 illustrates an isometric view of a circuit interconnect device racking apparatus positioned to be racked or plugged on according to embodiments.

FIG. 6 illustrates a starting position for a circuit interconnect device 605 and racking apparatus 600 being racked onto one or more bus bars (three bus bars 624A, 624B, and 624C shown). The racking lever 612 is initially positioned in a generally outward position to start. A detent mechanism may hold the racking lever 612 in this position. The circuit interconnect device 605 and racking apparatus 600 may be initially slightly tilted relative to the frame rail 625, as shown. The frame connectors 608 and 606 (not shown) are inserted into the connection features 626, and the assembly 600 is rotated towards the second rail 628 (e.g., center rail). As the assembly 600 is further rotated, a second cam mechanism component 630 (e.g., a pin) is received within the cam mechanism component 618 (e.g., the open-ended slot) of the racking lever 612. The racking lever 612 is then rotated as indicated by arrow 640 until the circuit interconnect device 605 and racking apparatus 600 are fully racked, as shown in FIG. 2C, for example, and as shown for the large circuit interconnect device 605L mounted directly below the circuit interconnect device 605.

Figure 7A:
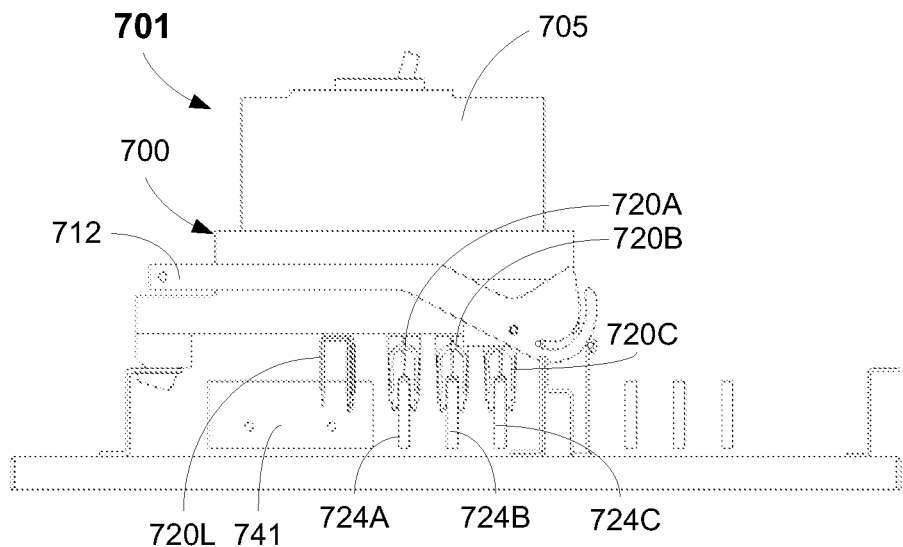
FIGS. 7A and 7B illustrate side views of a circuit interconnect device racking apparatus shown in a racked and un-racked configuration that exhibits an ability to electrically connect to both one or more line side bus bar and one or more load side conductors according to embodiments.
Figure 7B:
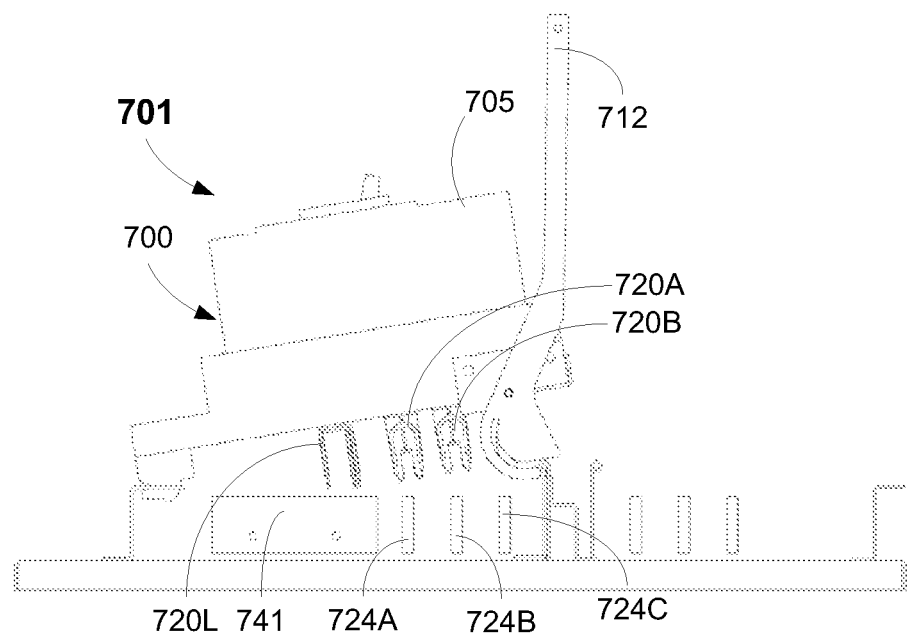
Figure 7C:
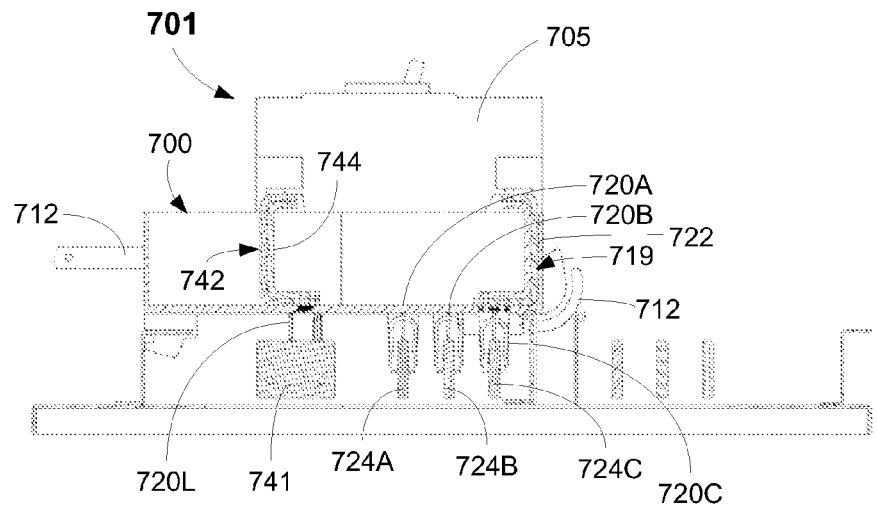
FIG. 7C illustrates a cross-sectioned side view of a circuit interconnect device racking apparatus having an ability to electrically connect to both line side bus bars and one or more load side conductor according to embodiments.

FIGS. 7A-7C illustrate another embodiment of circuit interconnect device racking assembly 701 including a circuit interconnect device racking apparatus 700 that includes the ability to connect to and disconnect from one or more load conductors 741 (e.g., one or more runbacks) on a load side. The illustrated circuit interconnect device racking apparatus 700 also includes, as have previous embodiments, the ability to connect to and disconnect from one or more conductor bars, such as bus bars 724A, 724B, and 724C on a line side. In the depicted embodiment, the racking apparatus 700 includes one or more load conductor assemblies 742 that connect to the one or more load conductors 741, such as for a rear connected application.

The one or more load conductor assemblies 742 may include, as shown in FIG. 7C, one or more load conductor bar straps 744 that connect load terminals of the circuit interconnect, device 705 to one or more load conductor connectors 720L (e.g., clips). The one or more load conductor connectors 720L may be identical to the bus conductor connectors 720A, 720B, 720C, which are the same as described and shown in FIG. 1I. Thus, responsive to rotation of the ranking lever 712, the one or more load conductor connectors 720L may be racked (or plugged) onto one or more load conductors 741 (e.g., one or more runbacks bar conductors) on a load side. Likewise, the one or more line conductor assemblies 719 may include, as shown in FIG. 7C, one or more line conductor bar straps 722 that connect one or more line terminals of the circuit interconnect device 705 to one or more line conductor connectors 720A, 720B, 720C (e.g., clips).

Figure 8:
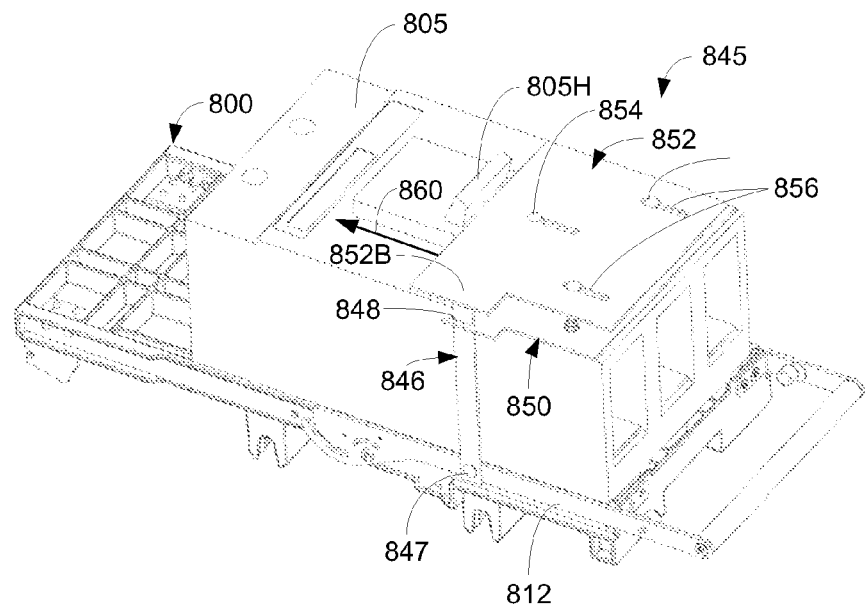
FIG. 8 illustrates an isometric view of an interconnect assembly for a circuit interconnect device racking apparatus having an ability to prevent racking and un-racking of the circuit interconnect device when in an ON configuration according to embodiments.

FIG. 8 illustrates an interlock assembly 845 adapted for use with any of the circuit interconnect device racking apparatus described herein (e.g., the circuit interconnect device racking apparatus 800). The interlock assembly 845 functions and is operational so prevent the racking lever 812 from being rotated, thereby un-racking the circuit interconnect device 805, if the circuit interconnect device handle 805H is in the ON configuration as shown. Also, if the racking lever 812 is not in a fully-racked position, the circuit interconnect device 805 cannot be switched to an ON configuration. In the ON configuration, the circuit interconnect device 805 is electrically closed, thereby closing any electrically-coupled electrical circuit. In the depicted embodiment, a blocking member 846 is pivotally coupled to the racking lever 812 along its length by a suitable pivot member 847, such as a shoulder pin. The blocking member 846 may be received in a guide 848 that functions to maintain the blocking member 846 in a defined orientation to the circuit interconnect device 805 (e.g., generally upright as shown). The guide 848 may be formed in or as part of a base member 850 that may be coupled to the molded body of the circuit interconnect device 805. The guide 848 may optionally be formed integrally with the molded body. The interlock assembly 845 may include a sliding member 852 that is configured to slide relative to the molded body of the circuit interconnect device 805. The sliding member 852 may be physically connected to the handle 805H so that they move (e.g., translate) together. Optionally, the sliding member 852 may be spring loaded towards the handle 805H, or manually moved against the handle 805H. For example, the sliding member 852 may be pinned to the handle 805H by a connector 854 (e.g., a shoulder screw or the like). Receiving features 856 (e.g., slots or the like) in the sliding member 852 may receive constraining members 858 (e.g., shoulder screws) coupled to the base 850 so that the sliding member 852 may translate along with the handle 805H.

In operation, if the handle 805H and circuit interconnect device 805 is in the ON position, then a blocking portion 852B of the moving member 852 lies over the end of the blocking member 846 and prevents its upward movement in the guide 848, as shown. This blocks motion of the racking lever 812. When the handle 805H is moved to configure the circuit interconnect device 805 in an OFF configuration, then the blocking portion 852B moves forward as shown by arrow 860 and the blocking portion 852B no longer lies above the end of the blocking member 846. Accordingly, this unblocks the blocking member 846 and allows the rotation of the racking lever 812 to un-rack or un-rack the circuit interconnect device 805. Alternatively, if the racking lever 812 is up, blocking member 846 blocks movement of sliding member 852, which in turn blocks the handle 805H and the circuit interconnect device 805 cannot be switched ON.

Figure 9A:
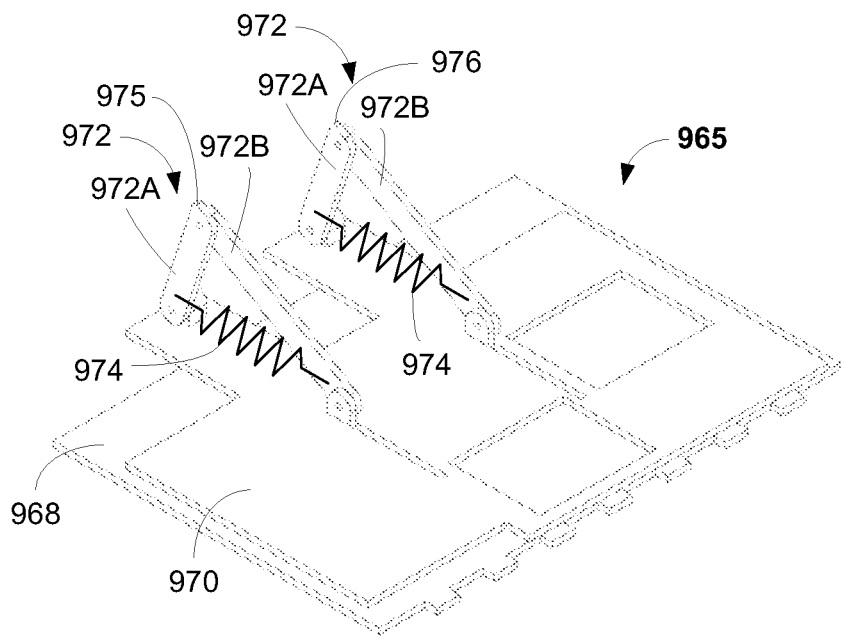
FIG. 9A illustrates an isometric view of an shutter apparatus configured to close off access to bus bars when a circuit interconnect device racking apparatus is un-racked or not present, shown in a closed configuration according to embodiments.
Figure 9B:
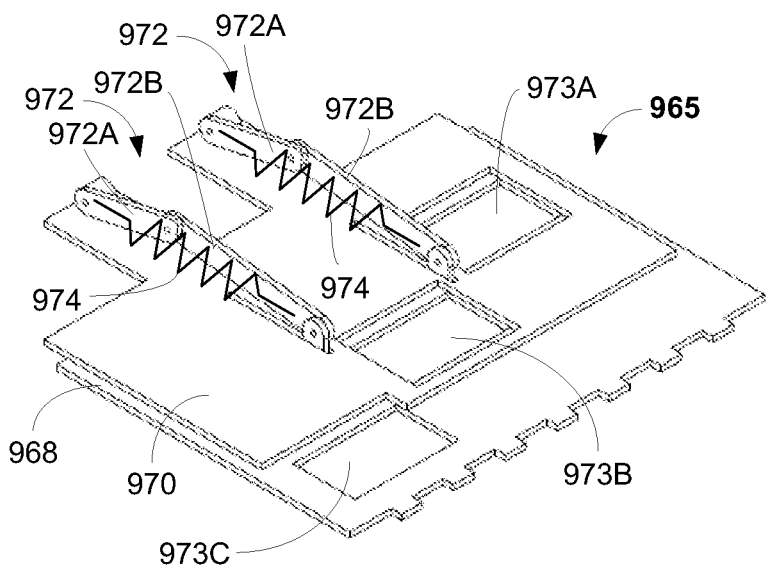
FIG. 9B illustrates an isometric view of an shutter apparatus configured to allow access to bus bars when a circuit interconnect device racking apparatus is being racked, shown in a opened configuration according to embodiments.
Figure 9C:
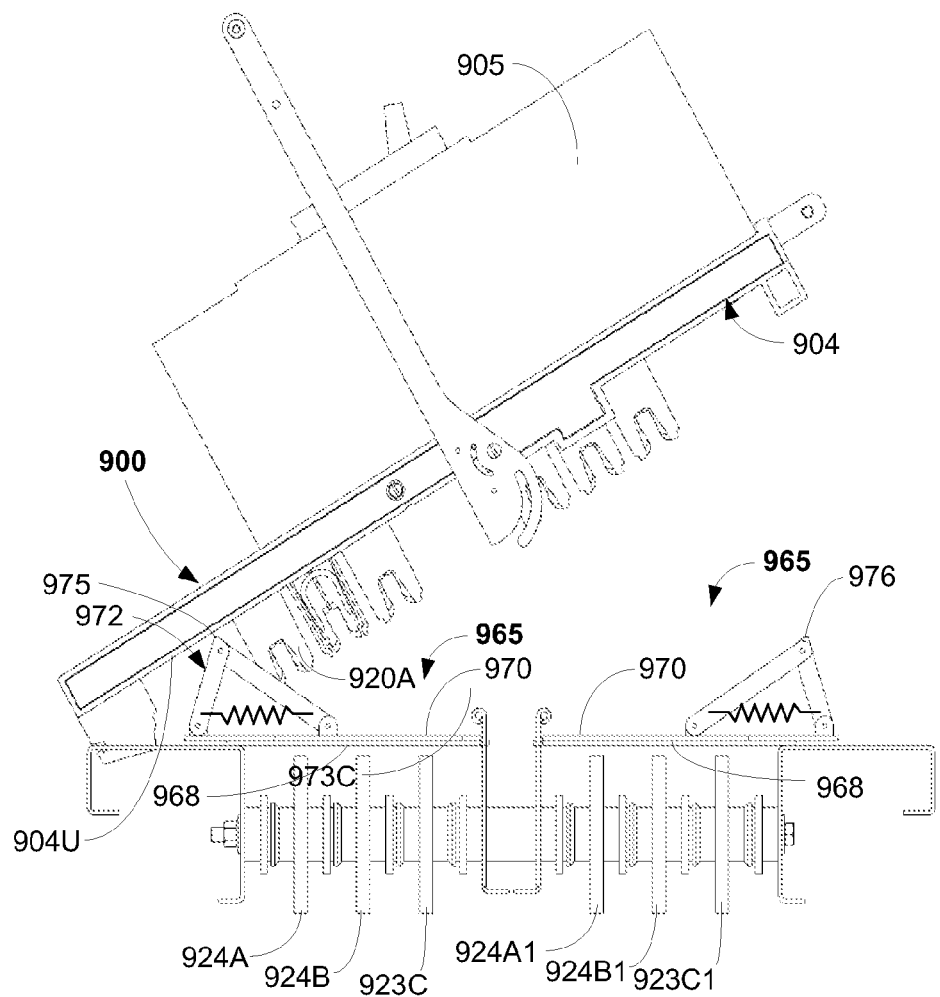
FIG. 9C illustrates a side view of one or more shutter apparatus engaging a circuit interconnect device racking apparatus according to embodiments.

FIGS. 9A-9C illustrate a shutter apparatus 965 that may be adapted for use with the circuit interconnect device racking apparatus 900. However, the shutter apparatus 965 is capable of broad use without the circuit interconnect device racking apparatus 900. The shutter apparatus 965 has a moveable shutter 970 that provides protection against accidental contact with any bare electrical conductors (e.g., bus bars 924A, 924B, 924C) in a compartment when the circuit interconnect device 905 is removed (e.g., un-racked) or not present. FIG. 9C is a side view (e.g., from a bottom side) showing the use of two shutter apparatus 965 according to embodiments. In particular, one apparatus 965 is provided for use with each set of bus bars 924A-924C and 924A1-924C1.

In this embodiment, the shutter apparatus 965 includes a base 968, a shutter 970, and one or more linkage assemblies 972. The shutter 970 of the shutter apparatus 965 is configured and operational to be opened by the rotational motion of the body 904 of the racking apparatus 900 contacting and displacing one or more linkage assemblies 972. When the shutter 970 is fully opened, the bus connectors 920A, etc. (e.g., clips) can engage the conductors (e.g., one or more bus bars 724A, etc.) through one or more access passages 973A-973C (FIG. 9B). The number of access passages 973A-973C may be equal to the number of phases/bus bars. The shutter apparatus 965 may include one or more springs 974 (e.g., coil springs) that may be connected at suitable locations (e.g., between links 972A, 972B) and may serve to return the shutter 970 to the closed position (FIG. 9A) when the circuit interconnect device racking apparatus 900 and coupled circuit interconnect device 905 are removed (un-racked).

FIG. 9C shows a large circuit interconnect device 905 that may require two shutter apparatus 965 since the circuit interconnect device 905 connects to both sets of line side bus bars 924A, etc. and 924A1, etc. A smaller circuit interconnect device (e.g., small circuit breaker) may only require only one shutter apparatus 965 since it may only engage on one set of line side bus bars (e.g., 124A-124C). For larger circuit interconnect devices (e.g., larger circuit breakers), the two shutter apparatus 965 operates in an essentially identical manner. As the circuit interconnect device and racking apparatus 900 rotates toward the plugged on position, an under surface 904U of the body 904 of the ranking apparatus 900 contacts and displaces the linkage assembly 972 at points 975 and 976. This displacement causes the linkages 972A, 972B to extend outward and open the shutters 970 as shown in FIG. 9B.

Figure 10:
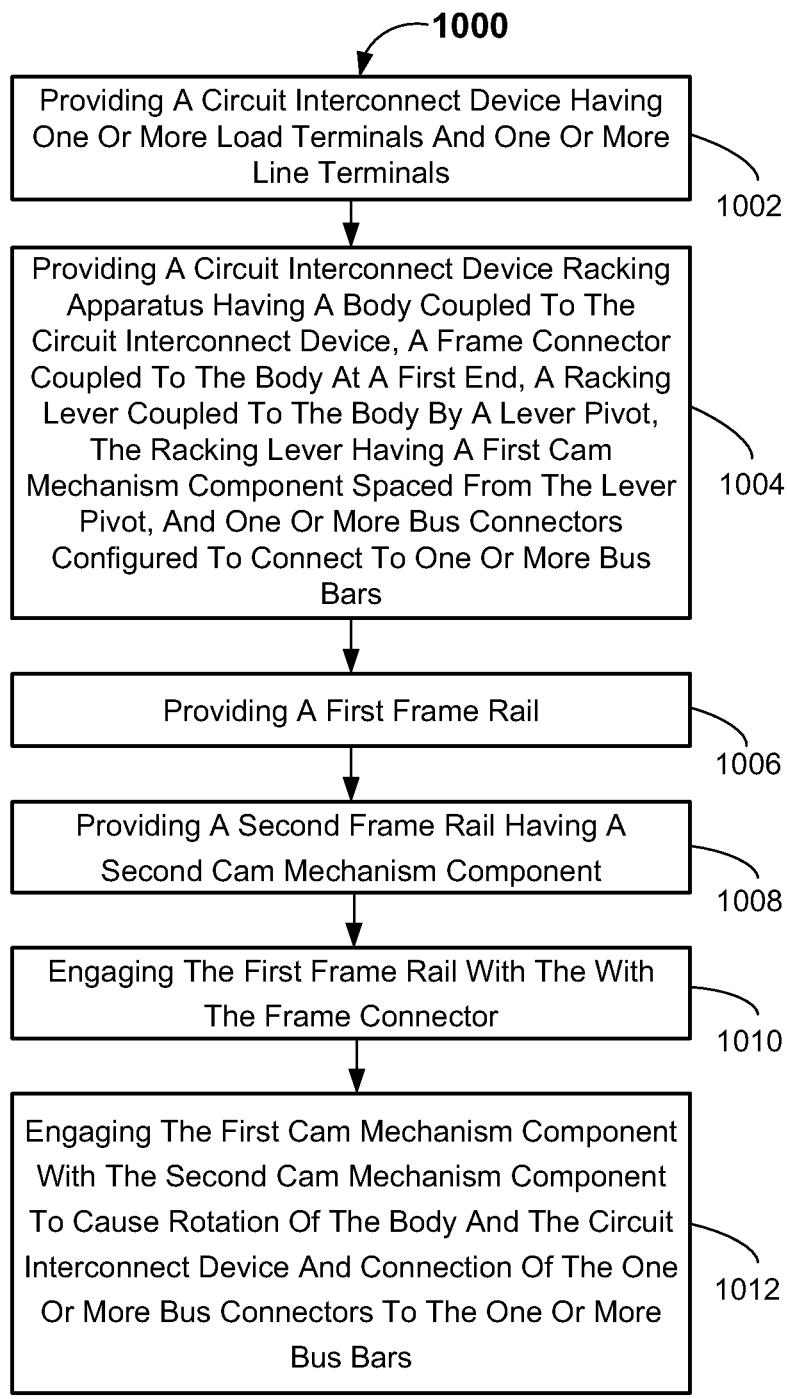
FIG. 10 is a flowchart illustrating a method of connecting a circuit interconnect device according to embodiments.

FIG. 10 is a flowchart illustrating a method of connecting a circuit interconnect device, such as to one or more bus bars according to embodiments. The method 1000 includes, in 1002, providing a circuit interconnect device having one or more load terminals and one or more line terminals, in 1004, providing a circuit interconnect device racking apparatus having a body coupled to the circuit interconnect device, a frame connector coupled to the body at a first end, a racking lever coupled to the body by a lever pivot (e.g., at a second end, or even in a middle in some embodiments), the racking lever having a first cam mechanism component spaced from the lever pivot, and one or more bus connectors configured to connect to one or more bus bars, in 1006 providing a first frame rail, and in 1008, providing a second frame rail having a second cam mechanism component. The method further includes, in 1010, engaging the first frame rail with the frame connector, and in 1012, engaging the first cam mechanism component with the second cam mechanism component to cause rotation of the body and the circuit interconnect device and connection of the one or more bus connectors to the one or more bus bars. The rotation may also connect one or more load connectors to the one or more load conductors (e.g., runbacks).

While the invention is susceptible to various modifications and alternative forms, specific embodiments and methods thereof have been shown by way of example in the drawings and are described in detail herein. It should be understood, however, that it is not intended to limit the invention to the particular apparatus, assemblies, or methods disclosed, but, to the contrary, the intention is to cover all modifications, equivalents and alternatives falling within the scope of the invention.

What is claimed is:

1. A circuit interconnect device racking apparatus, comprising:
   a body adapted to couple to a circuit interconnect device;
   one or more frame connectors coupled to the body at a first end;
   a racking lever coupled to the body by a lever pivot, the racking lever having a cam mechanism component spaced from the lever pivot; and
   one or more bus connectors configured to connect to or disconnect from one or more bus bars responsive to rotation of the racking lever.

2. The circuit interconnect device racking apparatus of claim 1, wherein the circuit interconnect device is one selected from a group consisting of a circuit breaker, a switch, a branch circuit monitor, a surge protection device, and a lug.

3. The circuit interconnect device racking apparatus of claim 1, comprising one or more bus conductor bar straps coupled to the one or more bus connectors.

4. The circuit interconnect device racking apparatus of claim 1, comprising one or more load connectors configured to connect to or disconnect from one or more load conductors responsive to rotation of the racking lever.

5. The circuit interconnect device racking apparatus of claim 1, comprising:

one or more bus conductor bar straps coupled to the one or more bus connectors; and
one or more load conductor bar straps coupled to the one or more load connectors.

6. The circuit interconnect device racking apparatus of claim 1, wherein the body comprises at least one pocket configured to receive one or more bus conductor bar straps coupled to the one or more bus connectors.

7. The circuit interconnect device racking apparatus of claim 1, wherein the body comprises at least one insulator sheath adapted to at least partially surround the one or more bus connectors.

8. The circuit interconnect device racking apparatus of claim 1, wherein the body comprises one or more pockets, each pocket being configured to receive a bus conductor bar strap, and one or more openings from the one or more pockets configured to receive the one or more bus connectors.

9. The circuit interconnect device racking apparatus of claim 1, wherein the cam mechanism component of the racking lever comprises a cam formed along an open-ended slot.

10. The circuit interconnect device racking apparatus of claim 1, comprising an interlock assembly operational to prevent the racking lever from being rotated if a circuit interconnect device handle of a circuit interconnect device coupled to the body is in an ON configuration.

11. The circuit interconnect device racking apparatus of claim 1, comprising an interlock assembly operational to prevent the circuit interconnect device from being switched to an ON configuration if the racking lever is not in a fully-racked configuration.

12. The circuit interconnect device racking apparatus of claim 1, comprising a shutter apparatus configured and operational to be opened or closed responsive to a rotational motion of the body.

13. A circuit interconnect device racking assembly, comprising:
a circuit interconnect device racking apparatus having
a body adapted to couple to a circuit interconnect device,
one or more frame connectors coupled to the body at a first end,
a racking lever coupled to the body by a lever pivot, the racking lever having a first cam mechanism component spaced from the lever pivot, and
one or more bus connectors configured to connect to one or more bus bars;
a first frame rail engageable by the frame connector; and
a second frame rail having a second cam mechanism component engageable by the first cam mechanism component to cause connection of the one or more bus connectors to one or more bus bars.

14. The circuit interconnect device racking assembly of claim 13, comprising one or more load connectors configured to connect to or disconnect from one or more load conductors responsive to rotation of the racking lever.

15. The circuit interconnect device racking assembly of claim 13, wherein the first frame rail comprises a plurality of slots adapted to receive the one or more frame connectors.

16. The circuit interconnect device racking assembly of claim 13, wherein the first cam mechanism component comprises an open-ended slot and the second cam mechanism component comprises a pin configured to engage a cam formed on the open-ended slot.

17. The circuit interconnect device racking apparatus of claim 13, comprising an interlock assembly operational to prevent the racking lever from being rotated if a circuit interconnect device handle of a circuit interconnect device coupled to the body is in an ON configuration.

18. The circuit interconnect device racking apparatus of claim 13, comprising a shutter apparatus configured and operational to be opened by a rotational motion of the body.

19. A circuit interconnect device racking assembly, comprising:
a circuit interconnect device racking apparatus including
a circuit interconnect device having one or more line terminals and one or more load terminals,
a body coupled to the circuit interconnect device,
one or more frame connectors coupled to the body at a first end,
a racking lever coupled to the body by a lever pivot, the racking lever having a first cam mechanism component spaced from the lever pivot,
one or more bus connectors configured to connect to one or more bus bars,
one or more bus conductor bar straps connected to the more or more line terminals;
a first frame rail having a plurality of slots receiving the one or more frame connectors;
a second frame rail having a second cam mechanism component engageable by the first cam mechanism component to cause rotation of the circuit interconnect device and the body and connection of the one or more bus connectors to the one or more bus bars.

20. The circuit interconnect device racking assembly of claim 19, comprising:
one or more load connectors configured to connect to or disconnect from one or more load conductors responsive to rotation of the racking lever.

21. The circuit interconnect device racking assembly of claim 19, comprising:
one or more load conductor bar straps coupled to one or more load connectors, the one or more load conductor bar straps being coupled to the one or more load terminals.

22. A method of connecting a circuit interconnect device, comprising:
providing a circuit interconnect device having one or more load terminals and one or more line terminals;
providing a circuit interconnect device racking apparatus having a body coupled to the circuit interconnect device one or more frame connectors coupled to the body at a first end, a racking lever coupled to the body by a lever pivot, the racking lever having a first cam mechanism component spaced from the lever pivot, and one or more bus connectors configured to connect to one or more bus bars;
providing a first frame rail;
providing a second frame rail having a second cam mechanism component;
engaging the first frame rail with the with the one or more frame connectors; and
engaging the first cam mechanism component with the second cam mechanism component to cause rotation of the body and the circuit interconnect device and connection of the one or more bus connectors to the one or more bus bars.

23. The method of claim 22, comprising:
connection of one or more load connectors to one or more load conductors.

24. The method of claim 22, comprising preventing, with an interlock assembly, the racking lever from being rotated if a handle of a circuit interconnect device coupled to the body is in an ON configuration.

25. The method of claim 22, comprising preventing, with the interlock assembly, the circuit interconnect device from being switched to an ON configuration if the racking lever is not in a fully-racked configuration.

26. The method of claim 22, comprising opening or closing a shutter of a shutter apparatus by a rotational motion of the body.

\* \* \* \* \*